US012726864B2

(12) United States Patent
Chandrashekar et al.

(10) Patent No.: US 12,726,864 B2
(45) Date of Patent: Sep. 1, 2026

(54) METHOD, APPARATUS AND SYSTEM RELATING TO A MOBILITY GROUP INDICATOR

(71) Applicant: Nokia Technologies Oy, Espoo (FI)

(72) Inventors: Subramanya Chandrashekar, Bangalore (IN); Srinivasan Selvaganapathy, Bangalore (IN); Karri Markus Ranta-Aho, Espoo (FI)

(73) Assignee: Nokia Technologies Oy, Espoo (FI)

( * ) Notice: Subject to any disclaimer, the term of this patent is extended or adjusted under 35 U.S.C. 154(b) by 309 days.

(21) Appl. No.: 18/703,648

(22) PCT Filed: Aug. 30, 2022

(86) PCT No.: PCT/EP2022/074105
§ 371 (c)(1),
(2) Date: Apr. 22, 2024

(87) PCT Pub. No.: WO2023/066556
PCT Pub. Date: Apr. 27, 2023

(65) Prior Publication Data

US 2025/0240682 A1 Jul. 24, 2025

(30) Foreign Application Priority Data

Oct. 22, 2021 (IN) ............................. 202141048295

(51) Int. Cl.
*H04W 36/00* (2009.01)
*H04W 36/08* (2009.01)

(52) U.S. Cl.
CPC ....... *H04W 36/0085* (2018.08); *H04W 36/08* (2013.01)

(58) Field of Classification Search
CPC ......... H04W 36/0061; H04W 36/0085; H04W 36/08; H04W 88/085
See application file for complete search history.

(56) References Cited

U.S. PATENT DOCUMENTS 11,233,551 B2 * 1/2022 Ye ......................... H04W 72/21
2013/0272132 A1 * 10/2013 Heo ...................... H04L 5/0037
370/236.2

(Continued)

*Primary Examiner* — Kashif Siddiqui
(74) *Attorney, Agent, or Firm* — Barta Jones, PLLC

(57) ABSTRACT

A method, e.g. performed by a user equipment (UE) connected to a first cell of a first distributed unit (DU) of a first base station is disclosed. The method comprises receiving configuration information for measuring at least part of a synchronization signal block (SSB) and/or a Channel State Information-Reference Signal (CSI-RS) associated with a physical cell ID (PCI) of a second cell and for observing information related to a mobility group indicator (MGI); measuring the at least part of SSB and/or CSI-RS that is associated with the PCI; and observing the information related to the MGI, wherein a combination of the measured at least part of SSB and/or CSI-RS and the information related to the MGI enables to determine at least one of: whether the second cell is an intra-DU cell, an inter-DU cell or an inter-base station cell with respect to the first cell. Corresponding methods performed by units of the first base station are disclosed. Further, a corresponding system and corresponding apparatuses, computer programs, and computer readable media are disclosed.

20 Claims, 12 Drawing Sheets

(56) References Cited

U.S. PATENT DOCUMENTS

| | | | | |
|---|---|---|---|---|
| 2019/0387561 | A1* | 12/2019 | Paladugu | H04B 7/0628 |
| 2021/0120481 | A1* | 4/2021 | Cheng | H04W 56/001 |
| 2021/0329515 | A1* | 10/2021 | Sharma | H04W 80/02 |
| 2021/0337394 | A1* | 10/2021 | Jin | H04W 24/02 |
| 2024/0121671 | A1* | 4/2024 | Zhou | H04W 36/0016 |
| 2025/0365625 | A1* | 11/2025 | Jin | H04W 36/08 |
| 2026/0046723 | A1* | 2/2026 | Da Silva | H04W 36/085 |

* cited by examiner

METHOD, APPARATUS AND SYSTEM RELATING TO A MOBILITY GROUP INDICATOR

TECHNICAL FIELD

Various example embodiments relate to a mobility group indicator (MGI), for example in a network using one or more disaggregated base station architectures, e.g. 5G Node-B (gNB).

BACKGROUND

Users and their user equipment (UE) may move through cellular networks. This mobility may cause situations where the UE may need to change its connection from its serving cell to a target cell. This is referred to as handover. Depending on the serving cell and the target cell, the handover may be carried out differently.

More specifically, in cellular networks like 5G, a base station may be a disaggregated architecture. Therefore, a base station may comprise multiple entities, e.g. a control unit (CU) and one or more distributed units (DUs). A DU may host multiple cells. As a consequence, considering a serving cell and a target cell, the following example scenarios may be distinguished for a handover. First, the serving cell and the target cell may be hosted by the same DU. Second, the serving cell and the target cell may be hosted by different DUs of the same base station. Third, the serving cell and the target cell may be hosted by different DUs of different base stations. In the first example scenario, it may be desirable to have the DU execute the handover between cells. In contrast, in the second or third example scenario, it may be required to involve a base station CU for the handover.

SUMMARY OF SOME EXAMPLE EMBODIMENTS

According to a first example aspect a UE is disclosed, the UE comprising at least one processor; and at least one memory including computer program code; the at least one memory and the computer program code configured to, with the at least one processor, cause the UE at least to perform the following:

- receiving configuration information for measuring at least part of a synchronization signal block (SSB) and/or a Channel State Information-Reference Signal (CSI-RS) associated with a physical cell ID (PCI) of a second cell and for observing information related to a mobility group indicator (MGI), e.g. using the CSI-RS, the UE being connected to a first cell of a first distributed unit (DU) of a first base station;
- measuring the at least part of SSB and/or CSI-RS that is associated with the PCI; and
- observing the information related to the MGI, wherein a combination of the measured at least part of SSB and/or CSI-RS and the information related to the MGI enables to determine at least one of: whether the second cell is an intra-DU cell, an inter-DU cell or an in-ter-base station cell with respect to the first cell.

The UE according to the first example aspect as described above will also be referred to as the apparatus according to the first example aspect in the following. It may be a UE of a cellular network, for instance a 3G, LTE/4G, 5G NR, 5G or 6G network. Further, it may be a mobile device, e.g. a handset, a smartphone, a tablet, a laptop, or any other mobile device. In various embodiments, it may be a vehicle for travelling in air, water, or on land, e.g. a plane or a drone, a ship or a car or a truck. It may also be a robot, a sensor device, a wearable device, an Internet of Things (IoT) device, a Machine Type Communication (TC) device, or the likes.

According to a second example aspect a unit of a first base station is disclosed, e.g. a DU and/or a CU, comprising at least one processor; and at least one memory including computer program code; the at least one memory and the computer program code configured to, with the at least one processor, cause the unit at least to perform the following:

- transmitting, to a user equipment (UE) connected to a first cell of the first distributed unit of the first base station, configuration information, for example indicating an association between one or more mobility groups and one or more respective CSI-RS resources, for measuring at least part of a synchronization signal block (SSB) and/or a Channel State Information-Reference Signal (CSI-RS) associated with a physical cell ID (PCI) of a second cell and for observing information related to a mobility group indicator (MGI), e.g. using the CSI-RS, wherein a combination of the at least part of SSB and/or CSI-RS having been measured and the information related to the MGI enables to determine at least one of: whether the second cell is an intra-DU cell, an inter-DU cell or an inter-base station cell with respect to the first cell.

According to a third example aspect, a unit, e.g. a first central unit (CU), of a first base station is disclosed, the unit comprising at least one processor; and at least one memory including computer program code; the at least one memory and the computer program code configured to, with the at least one processor, cause the unit at least to perform the following:

- transmitting, to a distributed unit of the first base station hosting a first cell, configuration information for a UE connected to the first cell, for example indicating an association between one or more mobility groups and one or more respective CSI-RS resources, for measuring at least part of a synchronization signal block (SSB) and/or a Channel State Information-Reference Signal (CSI-RS) associated with a physical cell ID (PCI) of a second cell and for observing information related to a mobility group indicator (MGI), e.g. using the CSI-RS, wherein a combination of the at least part of SSB and/or CSI-RS having been measured and the information related to the MGI enables to determine at least one of: whether the second cell is an intra-DU cell, an inter-DU cell or an inter-base station cell with respect to the first cell.

The unit according to the second or third example aspect as described above will also be referred to as the apparatus according to the second or third example aspect, respectively. As described above, it is a unit of a first base station. The unit may be comprised in or associated with the first base station. In various embodiments, the first base station may consist of the unit.

The unit and/or the first base station may be a network node or comprised in a network node and/or be functionality provided by a network node in various embodiments, for instance a network node of a cellular network, for instance a 3G, LTE/4G, 5G NR, 5G, or 6G network. The first base station may be a NodeB, eNB or gNB, an access point, or an access node. It may also be part of and/or connected with any other network. In various embodiments, the unit may be a distributed unit (DU) of the first base station. Additionally or alternatively, the unit may be a control unit (CU) of the first base station.

According to a fourth example aspect a network node is disclosed, the network node comprising at least one processor; and at least one memory including computer program code; the at least one memory and the computer program code configured to, with the at least one processor, cause the network node at least to perform the following:

configuring or contributing to configuring a first DU of a first base station to use a common MGI in one or more or all of its cells, wherein the first DU is one of a plurality of DUs; and configuring or contributing to configuring one or more other DUs of the plurality of DUs to use an MGI different from the common MGI used in the one or more or all of cells of the first DU for one or more or all of their or its cells.

The one or more or all of the cells of the one or more other DUs may particularly be cells that are adjacent to the first cell. The network node may be any entity of a cellular network, e.g. a gNB, and/or it may be embodied as described for any of the apparatuses according to the first or second example aspect. The network node may perform further actions, e.g. for configuring the use of MGIs and/or PCIs, for example as described above and below.

Additionally, a system is disclosed, the system comprising at least two apparatuses according to any of the example aspects, respectively.

Any disclosure herein relating to any example aspect is to be understood to be equally disclosed with respect to any subject-matter according to the respective example aspect, e.g. relating to an apparatus, a method, a computer program, and a computer-readable medium. Thus, for instance, the disclosure of a method step shall also be considered as a disclosure of means for performing and/or configured to perform the respective method step. Likewise, the disclosure of means for performing and/or configured to perform a method step shall also be considered as a disclosure of the method step itself. The same holds for any passage describing at least one processor; and at least one memory including computer program code; the at least one memory and the computer program code configured to, with the at least one processor, cause an apparatus at least to perform a step.

Furthermore, it is noted that terminology like “first cell”, “first base station” and “first distributed unit” was merely chosen for clarity in referencing. The term “first” as such do not have technical implications on what is to be understood by the respective object.

For Convenience, a List of Abbreviations Used in the Following is Already Given at this Point:

CRI CSI-RS Resource Indicator
CSI Channel State Information
CSI-RS Channel State Information-Reference Signal
CU Central Unit
CU-CP CU Control Plane
CU-UP CU User Plane
C-RNTI Cell RNTI
DM-RS Demodulation-Reference Signal
DRB Dedicated Radio Bearer
DL Downlink
DU Distributed Unit
gNB 5G Node-B
HO Handover
IE Information Element
L1 Layer-1
L2 Layer-2
L3 Layer-3
MAC Medium Access Control
MGI Mobility Group Indicator
MIB Master Information Block
MIMO Multiple Input Multiple Output
mTRP multi Transmission and Reception Point
PBCH Physical Broadcast Channel
PCell Primary Scell
PCI Physical Cell ID
PDCP Packet Data Convergence Protocol
PSS Primary Synchronization Signal
RLF Radio Link Failure
RRC Radio Resource Control
RSRP Reference Signal Received Power
RSRQ Reference Signal Received Quality
SIB System Information Block
SIB1 System Information Block Type 1
SRB Signalling Radio Bearer
SSB Synchronization Signal Block
SSS Secondary Synchronization Signal
TCI Transmission Configuration Indicator
UE User Equipment In the following, example details and example embodiments of the first and/or second example aspect introduced above will be described.

As described above, according to a second example aspect a unit of a first base station transmits, to a user equipment (UE) connected to a first cell of the first distributed unit of the first base station, configuration information, for example indicating an association between one or more mobility groups and one or more respective CSI-RS resources, for measuring at least part of a synchronization signal block (SSB) and/or a Channel State Information-Reference Signal (CSI-RS) associated with a physical cell ID (PCI) of a second cell and for observing information related to a mobility group indicator (MGI)

The transmission may happen particularly in a state where the UE is connected to a first cell of a first DU of the first base station, e.g. after initial access. The transmission may be at least partly over a wireless link between the first DU and the UE.

The unit transmitting the configuration above may be the DU. This DU may have received the configuration for instance from a CU of the first base station. Thus, the CU may have transmitting, to the distributed unit of the first base station hosting a first cell, configuration information for a UE connected to the first cell, for example indicating an association between one or more mobility groups and one or more respective CSI-RS resources, for measuring at least part of a synchronization signal block (SSB) and/or a Channel State Information-Reference Signal (CSI-RS) associated with a physical cell ID (PCI) of a second cell and for observing information related to a mobility group indicator (MGI), e.g. using the CSI-RS, wherein a combination of the at least part of SSB and/or CSI-RS having been measured and the information related to the MGI enables to determine at least one of: whether the second cell is an intra-DU cell, an inter-DU cell or an in-ter-base station cell with respect to the first cell.

An SSB may refer to a signal that can be used for synchronization, e.g. by a UE. It may comprise multiple parts, e.g. a primary synchronization signal (PSS) and/or a secondary synchronization signal (SSS) and/or a physical channel, e.g. a physical broadcast channel (PBCH). Further, it may for instance be transmitted periodically, e.g. from various or all cells in a network or area. Thus, a UE that searches for the synchronization signal on a frequency, e.g. for initial access or for mobility, can determine within or after a predetermined interval whether there is a synchronization signal on this frequency or not.

Regarding the action receiving configuration information for measuring at least part of a synchronization signal block (SSB) and/or a Channel State Information-Reference Signal (CSI-RS) signal associated with a physical cell ID (PCI) of a second cell: FIG. 9 shows an example of a SSB, also called synchronization signal/physical broadcast channel (SS/PBCH) block including e.g. PSS 910, SSS 930, and PBCH 920. In the example of FIG. 9, it can be seen that in time domain, the SSB consists of 4 OFDM symbols, where PSS, SSS and PBCH with associated demodulation reference signal (DM-RS) occupy different symbols. Similarly, in the example of FIG. 9, SSB consists of 240 contiguous subcarriers in frequency domain.

FIG. 10 shows an example of how SSBs can be positioned in frequency domain. In particular, FIG. 10 shows three bandwidth parts (BWPs), i.e. BWP1 1000, BWP2 1001 and BWP3 1002. One SSB 1004 is positioned within BWP1 1000 and a further SSB 1005 is positioned in BWP2. An SSB may be transmitted regular, e.g. as an always-on signal. It may be used for synchronization, system information (master information block (MIB)/system information block (SIB)) and/or cell and beam quality measurements.

A cell ID can e.g. be determined from PSS/SSS sequences, thus e.g. from part of the SSB. More specifically, the SSB may be associated with a PCI of a cell, e.g. the second cell, in that the PCI of the cell is derivable from the SSB. For example, the SSB may comprise a PSS and a SSS. The UE may then be able to derive the PCI of the second cell from the PSS and the SSS, e.g. using predefined rules and/or equations. It is noted that a PCI may uniquely identify a cell among the cells of a single DU.

As described above, the configuration information further relates to the observation of information related to a mobility group indicator (MGI).

MGI, as used herein, refers to an indicator that allows to distinguish cells of a first mobility group from cells of a second mobility group. For instance, all cells of the first DU may be configured to have and/or may be assigned the same MGI whereas cells of other DUs are assigned a different MGI. As a result, the MGI allows to distinguish the cells of the first DU forming a first mobility group from other cells which are part of a different mobility group.

The observation of information related to a MGI may be understood to comprise various actions. For example, it may comprise receiving and/or decoding and/or identifying a MGI. Additionally or alternatively, it may comprise detecting the presence or absence of any MGI or of a specific MGI.

An example of a MGI is a channel state information-reference signal (CSI-RS) configuration. Thus, a specific first MGI may be a specific first CSI-RS configuration. Similarly, a specific second MGI may be a specific second CSI-RS resource configuration, which may be different from the specific first CSI-RS resource configuration. Observing information related to a MGI may thus be understood to mean e.g. detecting the presence or absence of a CSI-RS with a specific configuration, e.g. the specific first CSI-RS configuration. However, in other embodiments the MGI may be defined differently, e.g. by an indicator or a configuration of another signal, e.g. another reference signal.

The CSI-RS configuration may also comprise a CSI-RS resource configuration. A very simple example of a CSI-RS resource configuration is the resource configuration for a single-port CSI-RS which may correspond for instance to a single resource element, e.g. one resource block in the frequency domain and one slot in the time domain. A CSI-RS configuration may further comprise e.g. a signature that, for instance, can be used to distinguish the CSI-RS from another CSI-RS.

It was described above that a unit of a first base station transmits the configuration information and that the unit can be for example a DU and/or a CU. Accordingly, at least two cases can be distinguished.

First, the case of the unit being a DU is considered. In this case, the configuration information may be a configuration information of the physical layer, e.g. layer 1 (L1). An example of such a configuration information is a CSI-ReportConfig. It may for example describe or indicate one or more quantities to be reported, one or more downlink resources on which measurements should be carried out in order to derive the quantity or quantities to be reported and/or how the actual reporting is done. In various embodiments according to the first or second example aspect, the configuration information is sent from a DU of the first base station, in particular the first DU, to the UE, and/or the configuration information relates to layer 1/layer 2 (L1/L2) measurements.

Second, the case of the unit being a CU is considered. In this case, the configuration information may be a configuration information e.g. of a layer higher than layer 1, e.g. layer 3 (L3). Examples of such a configuration information are configurations provided using radio resource control (RRC) messages, e.g. RRCReconfiguration or RRCResume. Thus, in various embodiments according to the first or second example aspect, the configuration information is sent from a central unit-control plane (CU-CP) of the first base station to the UE, and/or the configuration information relates to layer 3 (L3) measurements.

The configuration information transmitted by the unit of the first base station as described above may be received by the UE according to the first example aspect. Thus, the UE according to the first aspect receives the configuration information for measuring at least part of a SSB and/or CSI-RS associated with a PCI of a second cell and for observing information related to a MGI, e.g. of the second cell and/or associated with the PCI of the second cell.

The UE may be configured to be able to receive and/or process different types of configuration information. For example, the same UE may be configured to be able to receive L1 configuration information, e.g. configuration information relating to L1 measurements, and L3 configuration information, e.g. configuration information relating to L3 measurements. It may further be configured to report measurements differently depending on the type of the configuration information. For example, the UE may report a L1 measurement to the first DU of the first base station if it received a L1 configuration information and/or it may report a L3 measurement to a CU of the first base station if it received a L3 configuration information.

For instance, in various embodiments, the UE reports, to the first DU or a first central unit (CU) of the first base station, information related to power and/or an identify of at least part of SSB and/or CSI-RS in case the UE observed the specific MGI associated with the PCI.

Further, in various embodiments, the UE reports, in case of a determined intra-DU cell or an in-ter-DU cell, to the first DU information related to power of and/or an identity of at least part of SSB and/or CSI-RS, e.g. in case the UE observed the specific MGI associated with the PCI, and reports, in case of a determined inter-base station cell, to a first central unit (CU) of the first base station information related to power of and/or an identity of the measured at least part of SSB and/or CSI-RS, e.g. in case the UE observed the specific MGI associated with the PCI.

Moreover, in various embodiments, the UE reports, in case of a determined intra-DU cell or an inter-DU cell to the first DU, L1 measurements, and reports, in case of a determined inter-base station cell to a first central unit (CU) of the first base station, L3 measurements.

After and/or in reaction to receiving the configuration information for measuring at least part of a SSB and/or CSI-RS associated with a PCI of a second cell and for observing information related to a MGI, the UE measures the at least part of the SSB and/or CSI-RS that is associated with the PCI and observes the information related to the MGI.

Measuring the at least part of the SSB (herein also referred to as "measuring the SSB") and/or at least part of the CSI-RS (herein also referred to as "measuring the CSI-RS") may comprise deriving the PCI from the SSB and/or the CSI-RS. However, it may additionally or alternatively comprise measuring other properties, e.g. power, related to the SSB or CSI-CS. The measurement operation performed by the UE may depend on or be based on the received configuration information.

The observation of information related to a MGI may refer to various actions, as described above. Additionally, the observation operation performed by the UE may depend on or be based on the received configuration information.

In Various Example Embodiments According to the First or Second Example Aspect, the UE Further Performs:

- determining, based on the measured SSB and the observed information related to the MGI whether the second cell is an intra-DU cell with respect to the first cell.

In the alternative or in addition, the UE may determine (e.g. explicitly) whether the second cell is an intra-DU cell, an inter-DU cell or an inter-base station cell with respect to the first cell.

After having measured the SSB and having observed the information related to the MGI, the UE may have, store, process or report a combination of the measured SSB and the information related to the MGI. This combination relates to the second cell in that the information related to the MGI allows to determine the mobility group of the second cell, e.g. the DU of the second cell, and the measured SSB allows to determine the PCI of the second cell. As a result, the combination may be used to identify the second cell more reliably than only using the PCI. This may be used to determine whether the second cell is an intra-DU cell with respect to the first cell. It may additionally or alternatively be used to determine whether the second cell is at least one of e.g. an inter-DU cell or an inter-base station cell with respect to the first cell (and/or decide which of the three cell types the second cell is). In this context, the UE may for instance further use information that indicates the DU of the first cell and information that indicates the DU of the identified second cell. This information may for instance be provided by a DU. It is noted that, in case the PCIs are unique across cells of the same mobility group, e.g. due to a network configuration, the combination referred to above may even uniquely identify the second cell within a plurality of cells.

Additionally or alternatively, determining whether the second cell is an intra-DU cell (and possibly determining whether the second cell is an inter-DU cell) may also be done by e.g. comparing the MGI and/or the PCI of the first cell with the PCI associated with the measured SSB of the second cell and/or the observed information related to the MGI of the second cell, respectively. In this example, no information indicating the DU of the first cell and no information indicating the DU of the identified second cell may be required while it is still possible to determine whether the second cell is an intra-DU cell or not using the combination of the measured SSB and the information related to the MGI.

Additionally or alternatively, the UE may determine (e.g. explicitly) whether the second cell is an intra-DU cell, an inter-DU cell or an inter-base station cell with respect to the first cell using association information. For example, the configuration information may further comprise association information relating to an association between one or more mobility groups (which e.g. may be associated with one or more respective DUs) and one or more MGIs, where the one or more MGIs may be one or more respective CSI-RS configurations.

In the following, further example details and example embodiments of the example aspects introduced above will be described.

As described with respect to the fourth example aspect, a network node e.g. comprising or consisting of a CU or DU may perform:

- configuring or contributing to configuring a first DU of a first base station to use a common MGI in one or more or all of its cells, wherein the first DU is one of a plurality of DUs; and
- configuring or contributing to configuring one or more other DUs of the plurality of DUs to use an MGI different from the common MGI used in the one or more or all of cells of the first DU for one or more or all of their or its cells.

Further, the following embodiment is disclosed with regard to a third network node. The third network node (CU1; gNB-CU-CP) may be comprising at least one processor; and at least one memory including computer program code; the at least one memory and the computer program code configured to, with the at least one processor, cause the third network node (CU1; gNB-CU-CP) at least to perform the following:

- configuring or contributing to configuring a first network node (DU1; gNB-DU)) to use a common mobility group indicator (MGI) in one or more or all of its supported cells, wherein the first network node (DU1; gNB-DU) is one of a plurality of network nodes (DU2; DU3; DU4) supporting cells; and
- configuring or contributing to configuring one or more other network nodes (DU2; DU3; DU4) of the plurality of network nodes supporting cells to use an MGI different from the common MGI used in the one or more or all of cells of the first network node (DU1) for one or more or all of their or its supported cells.

The first network node (DU1; gNB-DU) may support a Distribution Unit functionality and/or L2 processing, the third network node (CU1; gNB-CU-CP) provides a Central Unit functionality and/or L3 processing.

Moreover, in context of the third network node (CU1; gNB-CU-CP) described above, the first network node (DU1; gNB-DU) may provide a serving cell.

The above embodiments may be used to ensure uniqueness of a MGI in a neighborhood of cells. Two further detailed example embodiments, which in various embodiments may or may not be considered to be more detailed embodiments of the embodiment above, may be as follows.

First, the Third Network Node (CU1; gNB-CU-CP) May Perform the Following:

- coordinating use of different mobility group indicators (MGI) in at least two cells of different network nodes supporting cells, by
- receiving an assigned common MGI of a first network node (DU1; gNB-DU) and receiving an assigned common MGI of a second network node (DU2),
- checking whether the two MGIs are the same or different,
- in case they are the same, transmitting towards one of the first or the second network node an instruction to change its MGI.

Specifically, a mapping between one or more MGIs and one or more respective CSI-RS may be done by a DU, e.g. the first DU. The mapping may be sent to the CU of the first DU, e.g. CSI-RS during F1 setup or gNB-DU configuration update and CU, in particular CU-CP, negotiates only when there is no uniqueness.

Second, the Third Network Node (CU1; gNB-CU-CP) May Perform the Following:

- coordinating use of different mobility group indicators (MGI) in at least two cells of different network nodes supporting cells, by
- configuring a first network node (DU1; gNB-DU) to use a first common MGI in at least one cell, e.g. one, two, or all cells, supported by the first network node and configuring a second network node (DU2; gNB-DU) to use a second common MGI in at least one cell, e.g. one, two, or all cells, supported by the second network node (DU2), wherein the first MGI is different from the second MGI.

Specifically, the mapping may be done by CU, e.g. CU-CP, and sent to DU during F1 setup or gNB-CU configuration update.

Lastly, CU, in particular CU-CP, may also send the MGI information of neighboring DUs to a serving DU to ensure that the serving DU understands the UE reported MGI of a cell in the neighboring DU. Thus, in various embodiments, a network node may inform the first network node (DU1; gNB-DU) that the second common MGI is used in at least one cell supported by the second network node (DU2). Additionally, the network node may further inform the first network node of one or more further common MGIs that are used in one or more further respective cells supported by one or more further network nodes (e.g., DUs).

In various embodiments according to one or more example aspects, the first DU is one of a plurality of DUs. The DUs of the plurality of DUs may be DUs of the same first base station as the first DU and/or of one or more different base stations.

In various embodiments according to one or more example aspects, a same, i.e. common, MGI is used in all cells of the first DU, and the MGI used in all cells of the first DU is different from all MGIs used in cells of one or more other DUs of the plurality of DUs, in particular in cells that are adjacent to the first cell. Thus, all cells of the first DU may form a mobility group that is identified by a single MGI. In contrast, other cells of other DUs, in particular cells adjacent to the first cell, may belong to a different mobility group and are thus identified by other MGIs. As a consequence, the observed information related to the MGI may directly provide information related to the DU of a cell. In particular, this may mean that, with respect for a first cell, one or more mobility groups are associated with at least one of intra-DU cells or inter-DU cells (and/or inter-base station cells). This may simplify the process of determining whether a second cell is e.g. an intra-DU cell or an inter-DU cell with respect to the first cell.

Further, in various embodiments according to one or more example aspects, the first DU is one of a plurality of DUs, the PCI is unique across the cells of the first DU, and the same PCI is assignable to one or more other cells of one or more other DUs of the plurality of DUs. In such a scenario the PCI is not a globally unique identifier of a cell and PCI ambiguity may occur. Thus, it is particularly beneficial to use a MGI as a further indicator to identify the second cell and/or determine whether the second cell is an intra-DU cell with respect to the first cell and/or whether the second cell is an inter-DU cell or an inter-base station cell with respect to the first cell.

In various embodiments according to one or more example aspects, the configuration information comprises information for the UE for observing information related to a specific MGI associated with the PCI and the UE reports, to the first DU or CU, information related to power of and/or an identity of the measured SSB and/or CSI-RS in case the UE observed the specific MGI associated with the PCI. This may also mean that the UE does not report this information, to the first DU or CU, in case the UE did not observe the specific MGI associated with the PCI. The reporting may further be based on the determining whether the second cell is an intra-DU cell with respect to the first cell. An example for information related to power of the measured SSB is L1-RSRP of SSB. For instance, by the determining, the UE may know whether to report e.g. L1-RSRP (e.g. measurements) e.g. to a gNB-DU and/or L3 (e.g. measurements), e.g. to gNB-CU-CP.

Thus, in a more specific example, the UE may be informed by the first DU or CU of a specific MGI. The specific MGI may be associated with the first DU. A situation may occur in which the UE observes that it cannot detect this specific MGI in the second cell. It will then not report the information related to power of the measured SSB and/or CSI-RS of the second cell. This means that the UE has determined that the second cell does not belong to the mobility group of the specific MGI. As the specific MGI is associated with the first DU, this means that the UE implicitly determines that the second cell is not an intra DU-cell with respect to the first cell.

In contrast, another situation may occur in which the UE observes that it can detect this specific MGI in the second cell. It will then report the information related to power of the measured SSB and/or CSI-RS, thereby determining that the second cell does belong to the mobility group of the specific MGI. As the specific MGI is associated with the first DU, this means that the UE has determined that the second cell is an intra DU-cell with respect to the first cell.

In various other embodiments according to one or more example aspects, the configuration information comprises information for the UE for observing information related to a specific MGI associated with the PCI and the UE reports, to the first DU or a first CU of a first base station, information related to power of the measured SSB and/or CSI-RS and information related to power measured in the course of observing the information related to the MGI associated with the specific PCI. This may enable the first DU or CU to determine whether the second cell is e.g. an intra-DU cell, an inter-DU cell or an inter-base station cell with respect to the first cell. Thus, while in the previous embodiments the UE determined whether the second cell is e.g. an intra-DU cell with respect to the first cell, in these embodiments the determining may be done by the first DU or CU. It is noted that an example for power measured in the course of observing the information related to the MGI associated with the specific PCI is L1-RSRP of the information related to the MGI, e.g. L1-RSRP of a CSI-RS.

In various embodiments according to one or more example aspects, the UE reports, to the first DU or CU, information identifying a MGI it observed. This may enable the first DU/CU to determine whether the second cell is e.g. an intra-DU cell, an inter-DU cell or an inter-base station cell with respect to the first cell. More specifically, the first DU may be informed by a CU-CP, to which it is connected, of specific MGIs used by neighboring DUs of the same CU-CP. So when the first DU receives the report from the UE, it may not only determine whether the second cell is e.g. an intra-DU cell with respect to the first cell, but e.g. also whether it is an inter-DU cell, e.g. because a MGI corresponding to one of the informed specific MGIs was observed and reported by the UE, or an inter-base station cell, e.g. because no MGI corresponding to one of the informed specific MGIs was observed and reported by the UE.

In Various Embodiments According to One or More Example Aspects, the UE Performs:

- a plurality (e.g. at least two) of iterations of measuring a respective SSB and/or CSI-RS that is associated with a respective PCI and of observing respective information related to a respective MGI;
- selecting, according to predefined rules, an observed power indicator value from a plurality (e.g. at least two) of observed power indicator values associated with respective observed information related to a respective MGI; and
- reporting, to the first DU or CU, information related to the selected observed power indicator value and information identifying the SSB and/or CSI-RS measured in the same iteration of the plurality of iterations as the selected observed power indicator value.

Thus, for example, the UE can select the observed power indicator value indicating the strongest power from the plurality of observed power indicator values associated with respective observed information related to a respective MGI. The information identifying the SSB may be e.g. a resource indicator pointing to measured SSB.

The steps above may be beneficial in various scenarios. That is because for mobility purposes it may be sufficient for the first DU if it can determine whether the second cell is an intra-DU cell, an inter-DU cell or an inter-base station cell with respect to the first cell. This may be achieved with the above steps, so that UE does not need to perform complete measurements for reporting information related to power of the measured SSB and/or CSI-RS, e.g. RSRP reporting, and information related to power measured in the course of observing the information related to the MGI, e.g. RSRP reporting.

According to Various Embodiments of the First or Second Example Aspect, the UE Performs the Following:

- receiving a cell change command comprising information indicating a PCI and information indicating a specific MGI associated with the PCI; and
- identifying, based at least on the information indicating the PCI and on the information indicating the specific MGI associated with the PCI comprised in the cell change command, a target cell for a cell change.

It can be seen that the combination of a PCI and the information related to a MGI may not only enable to determine (e.g. by the UE or by the unit of a first base station) whether the second cell is e.g. an intra-DU cell (or possibly an inter-DU cell or an inter-base station cell) with respect to the first cell in the context of determining whether the UE should perform a cell change. Instead, a combination of information indicating a PCI and information indicating a specific MGI associated with the PCI can also be used in the process of performing a cell change, e.g. a handover, of the UE. This use may in particular occur after it has been determined, e.g. by a unit of the first base station, that the UE should perform a cell change.

An example of the cell change command is a medium access control (MAC) control element (CE) that actuates an L1 handover (HO). It may comprise a TCI state that comprises the PCI of an SSB and information indicating a CSI-RS, e.g. a specific CSI-RS resource configuration that is an example of a specific MGI.

Some example embodiments will now be described with reference to the accompanying drawings. It is to be understood, however, that the drawings are designed solely for purposes of illustration and only serve as non-limiting examples. It should be further understood that the drawings are not drawn to scale and that they are merely intended to conceptually illustrate the structures and procedures described herein.

BRIEF DESCRIPTION OF THE FIGURES

It is Shown in.

DETAILED DESCRIPTION OF EXAMPLE EMBODIMENTS

Figure 1:
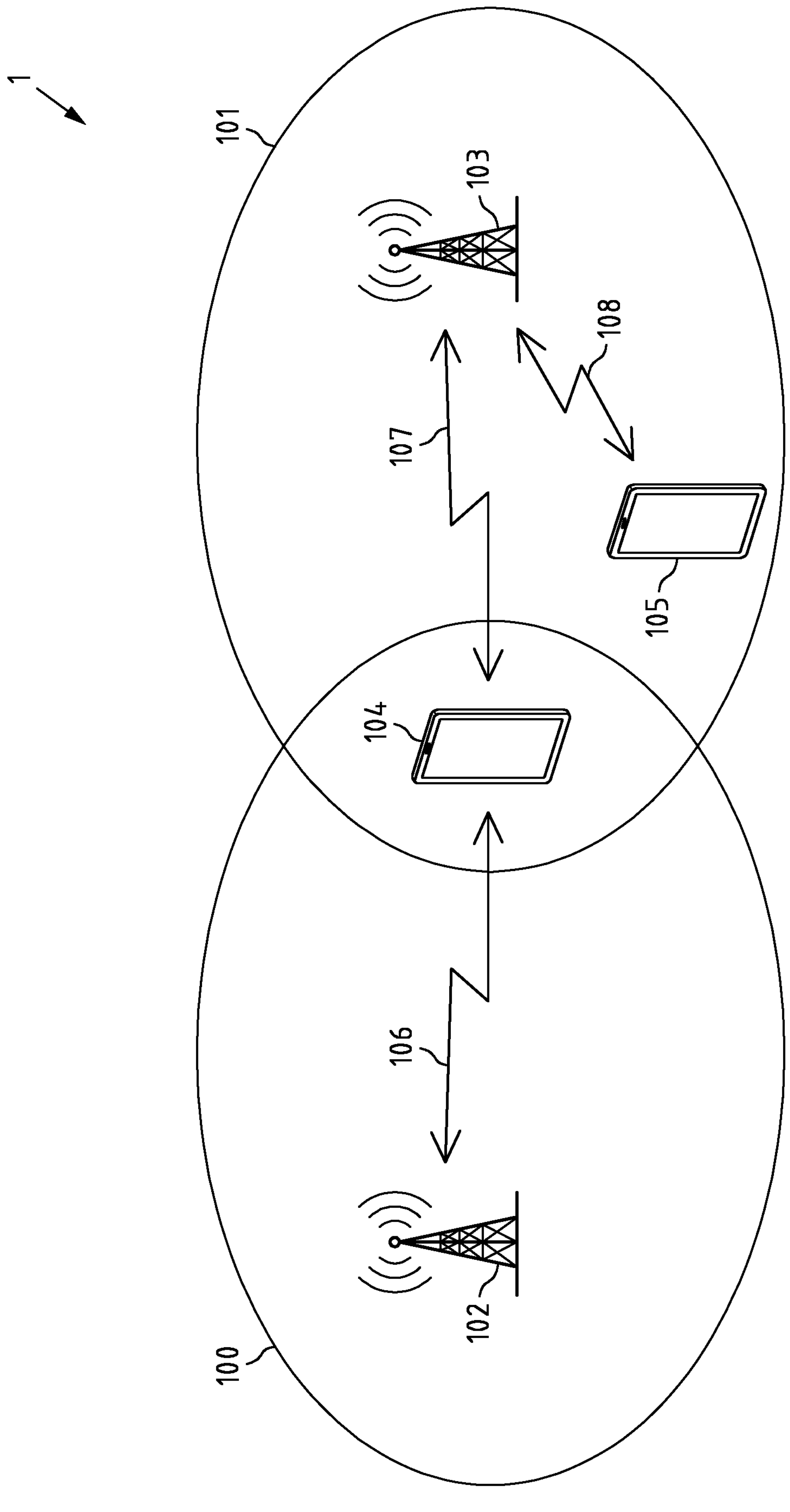
FIG. 1 a schematic diagram of a system according to an example embodiment, showing a UE in an overlapping cell region.

FIG. 1 shows a schematic diagram of a system 1 according to an example embodiment, showing a UE 104 in an overlapping cell region.

More specifically, FIG. 1 shows a first cell 100 of a first base station 102 and a second cell 101 of a second base station 103. Additionally, FIG. 1 shows a first UE 104 and a second UE 105.

The second UE 105 is located in the second cell 101. It is connected to the second cell 101 of the second base station 103 via a radio link 108.

The first UE 104 is located in the overlapping cell region of the first cell 100 and the second cell 101. It may for example be connected to the first cell 100 of the first base station 102 via a radio link 106. However, at the same time it may be able to measure and/or observe information related to transmissions 107 from the second base station 103 in the second cell 101.

The scenario shown in FIG. 1 is an example for a scenario of user mobility. In such a scenario, the first UE 104 may report, to the first base station 102, measurements of or information relating to transmissions 107 from the second base station 103. The first base station 102 may then determine whether to command the first UE 104 to change its connection from the first cell 100 to the second cell 101, for instance depending on the reported measurements or information. In this context, it may be necessary for the first UE 104 and/or the first base station 102 or parts thereof to determine whether the second cell 101 is e.g. an intra-DU cell with respect to the first cell 100. In the system 1 of FIG. 1 this is not the case. Instead, by way of example, the second cell 101 is an inter-base station cell with respect to the first cell 100 in the system 1 of FIG. 1.

Thus, as described above, the UE may need to report measurements of transmissions from one or more potential target cells and also to the right unit. Thus, it may be necessary to determine whether to report e.g. layer 1 (L1) measurements to a DU or whether to report e.g. layer 3 (L3) measurements to a CU.

Additionally, it may be required that the potential target cells can be identified, e.g. distinguished from other potential target cells. This may generally be done using a cell identifier. In cellular networks like 5G, the physical cell ID (PCI) could be considered for this. However, the allocation of PCIs to cells may be managed independently at a respective DU, e.g. without static PCI list reservation across neighbouring DUs. As a result, PCIs may be ambiguous across DUs.

In the context of 5G, a previous solution addressed the issue of ambiguous PCIs. However, the solution involved the UE reading a system information block 1 (SIB1) each time the UE has to report L1 reference signal received power (RSRP) measurements for the ambiguous PCIs preconfigured by the CU-control plane (CP) in the radio resource control (RRC) reconfiguration.

Figure 2:
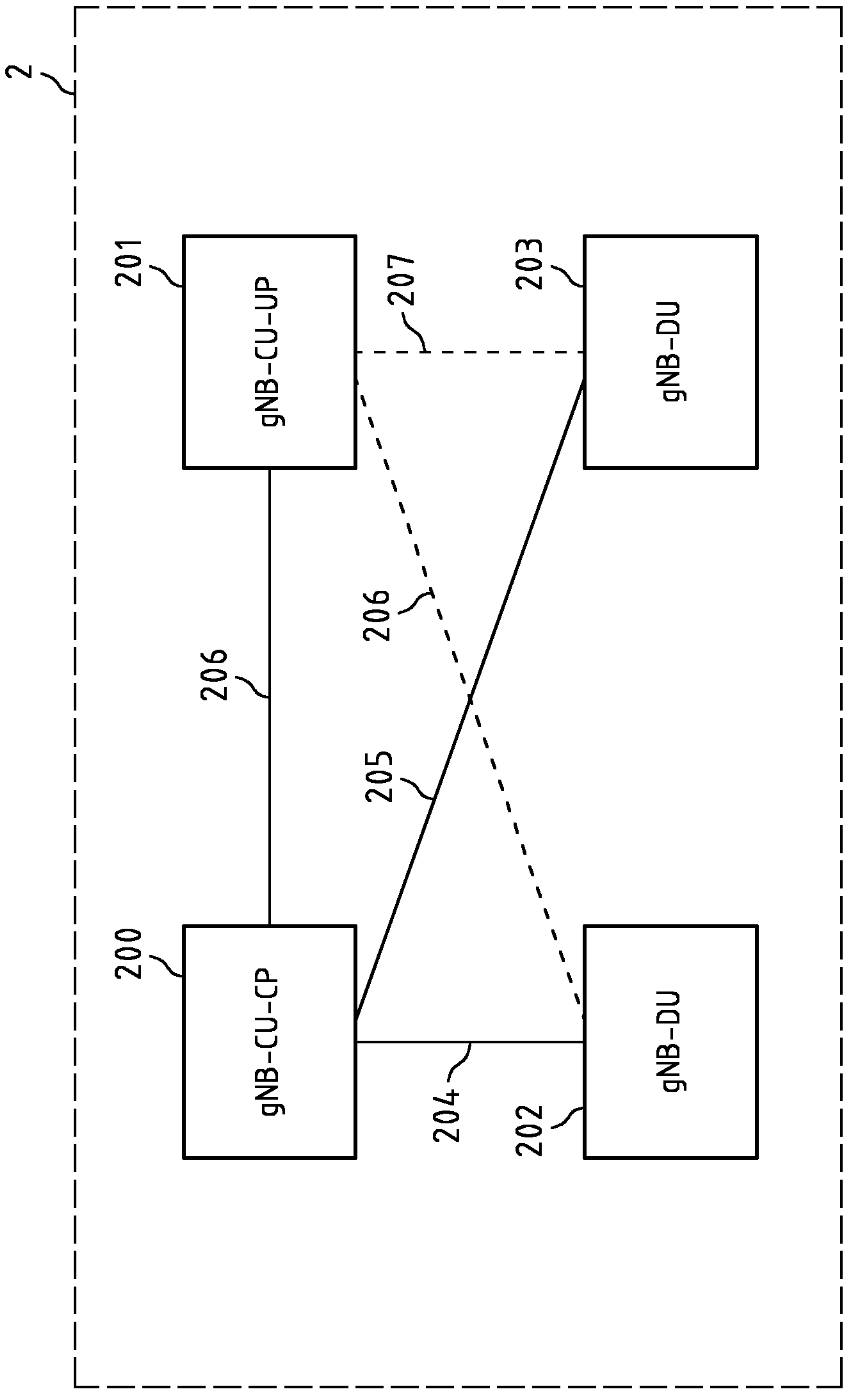
FIG. 2 a schematic diagram of a first base station according to an example embodiment.

FIG. 2 shows a schematic diagram of a first base station 2 according to an example embodiment. By way of example, the first base station 2 is a gNB, e.g. of a 5G network. It may have a disaggregated architecture according to which it is decomposed into multiple logical and/or physical entities.

In particular, as shown in FIG. 2, it may have a central unit (CU), comprising e.g. a control plane (CP) and a user plane (UP), shown by way of example as gNB-CU-CP 200 and gNB-CU-UP 201, respectively. The gNB-CU-CP 200 and the gNB-CU-UP 201 are connected via an interface 206 which may be referred to as E1 interface.

Further, the first base station 2 may comprise multiple distributed units (DUs), shown by way of example as gNB-DU 202 and gNB-DU 203 in FIG. 2. Each of gNB-DU 202 and gNB-DU 203 may be connected to the gNB-CU-CP 200 by a respective interface 204, 205 which may be referred to as F1-C interface. Moreover, each of gNB-DU 202 and gNB-DU 203 may be connected to the gNB-CU-UP 201 by a respective interface 206, 207 which may be referred to as F1-U interface A single DU may host multiple cells. However, the number of cells per DU, e.g. gNB DU 202, 203, may be limited, e.g. to 512.

Some functionality of the first base station 2 may be provided by the CU, e.g. gNB-CU-CP 200, while other functionality of the first base station 2 may be provided by a DU. Which functionality is provided by the CU and which functionality by the DU may be configured and/or predefined. Merely as an example, it will be assumed in the following that the gNB-CU-CP 200 hosts the PDCP and RRC layers, while the gNB-DUs 202, 203 each host the RLC, MAC and PHY layers. The scheduling operation may for instance take place at a gNB-DU 202, 203.

The disaggregated architecture of the first base station 2 (and one or more or all further base stations in a same network), as described above, may effect various processes in the network.

For instance, for a given network design like 3GPP Release 17, multiTRP (mTRP) operation to support transmission and reception of multiple beams from different cells may be limited to cells that belong to the same gNB-DU, e.g. 202 or 203. Likewise, a potential change of serving cell via L1/L2 mechanisms may not be possible in such a network design like 3GPP Release 17.

In contrast, in another network design which may use e.g. the same disaggregated base station architecture, this may be different. In such a different design, also support for change of serving-cell, e.g. handover, via L1/L2 based mechanisms in both intra-DU and inter-DU scenarios may be possible. This may be beneficial in that a change of serving-cell via L1/L2 based mechanisms in both intra-DU and inter-DU scenarios may be efficient, e.g. because it may avoid some overhead and/or delay due to higher layer communication with a CU, e.g. the gNB-CU-CP 200. In order to support L1/L2 centric inter-cell change (i.e. change of serving cell) in a network using the disaggregated gNB architecture, a mechanism may be used in which a configuration of the cell-change, e.g. configuration of L1-RSRRP measurements to report target cell measurements and/or configuration to enable switching of beams across cells, may take place at the gNB-CU-CP 200 while the cell change is executed by a gNB-DU 202, 203, e.g. autonomously and/or without further interaction with the upper layers.

This May Relate to Two Aspects:

a. Multi TRP operation involving serving and assisting cells, both intra-DU and inter-DU scenarios;

b. L1/L2 centric inter-cell change, both intra-DU and inter-DU scenarios.

Both aspects may relate to a UE making measurements. More specifically, before a UE changes a cell, the UE may make measurements of neighbour cells for handover. In particular, a UE that is connected to a first cell, e.g. by being in connected mode, may make measurements of neighbour cells for handover based on either SSB or CSI-RS of the respective neighbour cell. One or each of these neighbour cells may be considered to be a potential target cell for a handover. Similarly, for beam management, UE can be either configured to measure SSB or CSI-RS of target beams.

Measurements of SSB or CSI-RS may be referred to as downlink measurements. The CSI-RS resources for downlink measurements, e.g. the resources of the CSI-RS which the UE should measure, can be configured or informed to the UE by a base station (or e.g. a CU or DU thereof), e.g. via dedicated RRC signalling. Alternatively or additionally, these resources may also be dynamically allocated to UE in connected mode, e.g. depending on the mobility conditions, e.g. of the UE. For L1/L2 mobility for inter-cell beam switching, measurements, e.g. L1-RSRP measurements, can also be configured with SSB or CSI-RS resources.

Thus, UE may be configured to make different kind of measurements. As will be described with reference to FIG. 3 in the following, UE may also report the measurements to different types of units of a base station.

Figure 3:
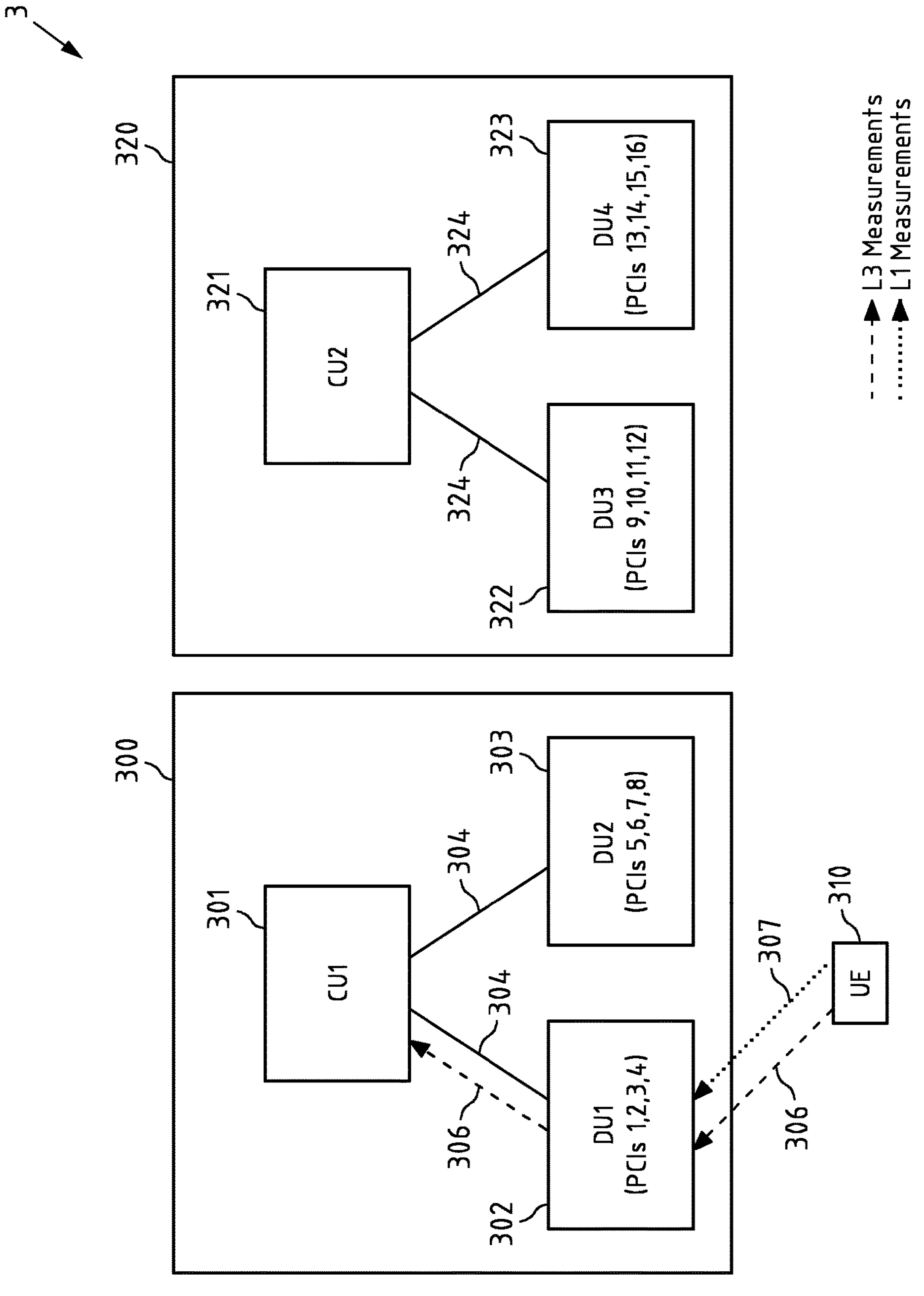
FIG. 3 a schematic diagram of a system according to an example embodiment, showing example measurement types reported by a UE to different units of a first base station.

FIG. 3 shows a schematic diagram of a system 3 according to an example embodiment, showing example measurement types (L1 measurements, L3 measurements) reported by a UE 310 to different units of a first base station 300.

By way of example, system 3 comprises a UE 310 and two base stations, a first base station 300 and a second base station 320.

The first base station 300 comprises a central unit CU1 301 and two distributed units DU1 302 and DU2 303. By way of example, DU1 302 hosts four cells, wherein each cell is assigned a single PCI of the PCIs 1, 2, 3, and 4 that is different from the PCIs of the other cells hosted by DU1 302. Similarly, by way of example, DU2 303 hosts four cells with uniquely assigned PCIs 5, 6, 7, 8. DU1 302 and DU2 303 are connected to CU1 301 via interface 304, respectively. This interface 304 may be referred to as F1 interface.

Similarly, the second base station 320 comprises a central unit CU2 321 and two distributed units DU3 322 and DU4 323. By way of example, DU3 322 hosts four cells, wherein each cell is assigned a single PCI of the PCIs 9, 10, 11, and 12 that is different from the PCIs of the other cells hosted by DU3 322. Similarly, by way of example, DU4 323 hosts four cells with uniquely assigned PCIs 13, 14, 15, 16. DU3 322 and DU4 323 are connected to CU2 321 via a respective interface 324. This interface 324 may be referred to as F1 interface.

The following principle is illustrated by FIG. 3.

By way of example, it is assumed that the L1/L2 centric inter-cell change described above may be applicable for intra-DU cell changes and inter-DU cell changes.

An intra-DU cell change may refer to a cell change from a first cell of a first DU of a first base station to a second cell of the same first DU of the same first base station. An example of an intra-DU cell change is a cell change from one of the cells of DU1 302, e.g. the cell having PCI 1, to another cell of DU1 302, e.g. the cell having PCI 3.

An inter-DU cell change may refer to a cell change from a first cell of a first DU of a first base station to a second cell of a different, second DU of the same first base station. An example of an in-ter-DU cell change is a cell change from one of the cells of DU1 302, e.g. the cell having PCI 1, to a cell of DU2 303, e.g. the cell having PCI 5.

In both scenarios, i.e. intra-DU cell change and inter-DU cell change, the UE 310 may make measurements of one or more potential target cells for the respective cell change, e.g. handover. The measurements may for instance comprise measuring the power of a signal transmitted from the respective potential target cell. Since in the given example the L1/L2 centric inter-cell change described above is applicable for intra-DU cell changes and inter-DU cell changes, both the intra-DU cell change and the inter-DU cell change may be handled by the DU1 302 using L1 measurements 307. Thus, for instance, the UE 310 may be configured to make and/or report L1 measurements 307 to the DU1 302.

In contrast, in the present example, an inter-base station cell change may be handled by CU1 301, in particular the control plane of CU1, using L3 measurements 306.

An inter-base station, e.g. inter gNB, cell change may refer to a cell change from a first cell of a first DU of a first base station to a second cell of a DU of a different, second base station. An example of an inter-base station cell change is a cell change from one of the cells of DU1 302, e.g. the cell having PCI 1, to a cell of DU3 322, e.g. the cell having PCI 9. To enable the CU1 301 to handle the inter-base station cell change using L3 measurements 306, UE 310 may need to report L3 measurements 306 to CU1 301.

The UE 310 and/or one or more units of the base stations 300, 320 may perform the actions of the example embodiments according to the first and second example aspect, respectively, to enable and/or be able to determine whether the second cell is an intra-DU cell, an inter-DU cell or an inter-base station cell with respect to the first cell. As a result, it may be determined, e.g. by the UE 310, whether the UE 310 may need to report measurements, e.g. L1 RSRP measurements, to the DU of the first cell, e.g. DU1 302, and/or whether the UE 310 may need to report measurements, e.g. L3 measurements, to the CU of the first base station, e.g. CU1 301. In various embodiments, enabling the determining whether the second cell is an intra-DU cell, an inter-DU cell or an inter-base station cell with respect to the first cell so that measurements may be reported to the right unit of the base station may be beneficial in terms of timely and proper execution of cell changes, e.g. L1/L2 handovers and L3 handovers.

In the above description of FIG. 3 it was, by way of example, assumed that the L1/L2 centric in-ter-cell change (also referred to as L1 mobility) is applicable for intra-DU cell changes and inter-DU cell changes, whereas an inter-base station cell change was handled by a CU using L3 measurements (also referred to as L3 mobility). However, other scenarios are possible. For example, in an alternative embodiment L1 mobility may be implemented for intra-DU cell changes, whereas L3 mobility is used for inter-DU and inter-base station changes. In such a scenario, the UE 310 would possibly on the one hand need to report L1 measurements for a second cell that is an intra-DU cell with respect to the first cell to the DU of the first cell. On the other hand, the UE 310 would possibly need to report L3 measurements for a second cell that is an inter-DU or an inter-base station cell with respect to the first cell to the CU, in particular its CP, of the first base station.

As described above, the UE 310 and/or one or more units of the base stations 300, 320 may perform the actions of the example embodiments according to the first and second example aspect, respectively, to enable and/or be able to determine whether the second cell is an intra-DU cell, an inter-DU cell or an inter-base station cell with respect to the first cell so that the UE 310 may report measurements to the right unit of the base station. To enable and/or be able to determine whether the second cell is an intra-DU cell, an inter-DU cell or an inter-base station cell with respect to the first cell, a combination of the measured SSB and the information related to the MGI is provided. This approach may be particularly beneficial in the scenario described in the following with respect to FIG. 4.

Figure 4:
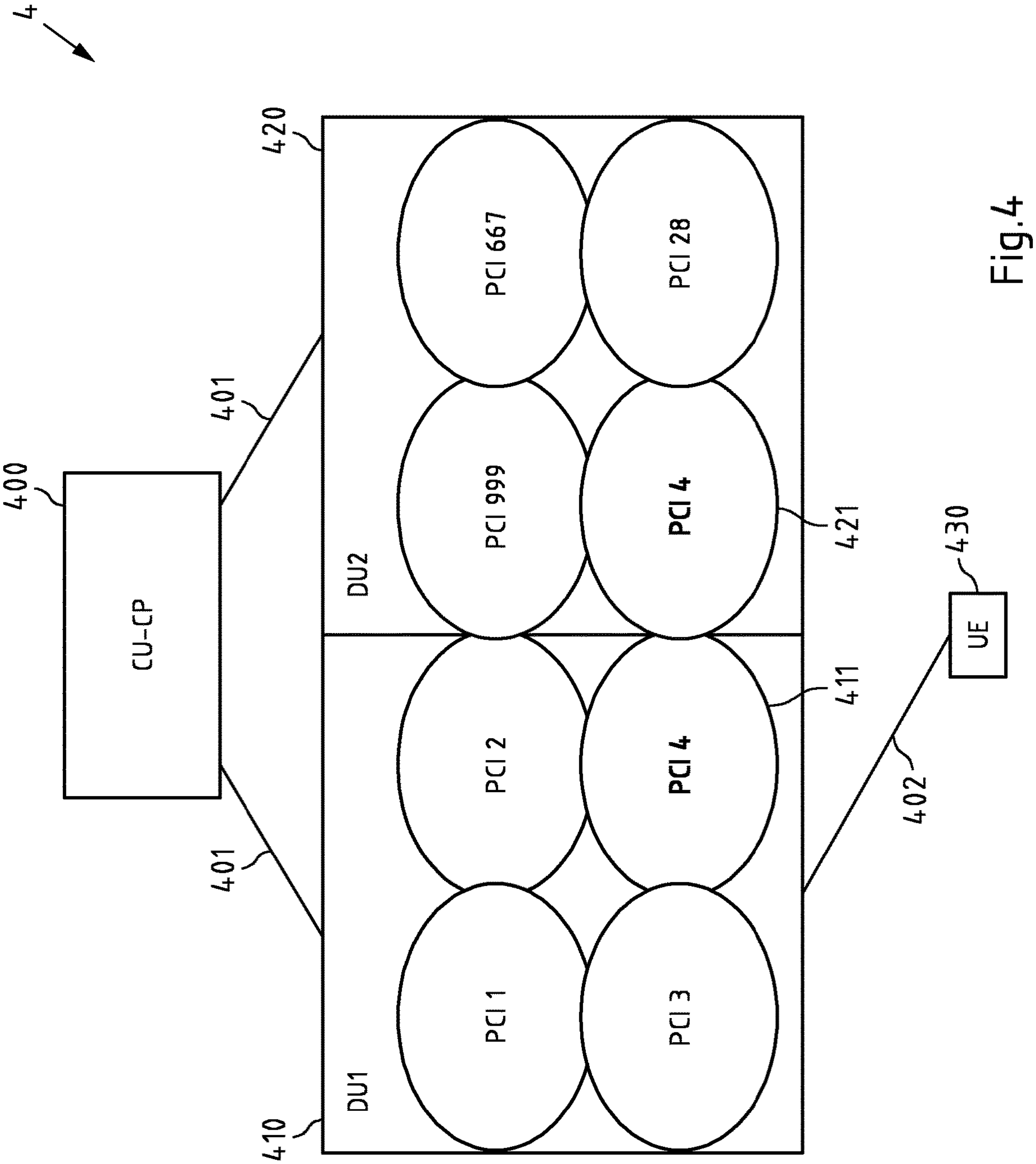
FIG. 4 a schematic diagram of a system according to an example embodiment, showing PCIs of cells of two DUs connected to the same CU-CP.

FIG. 4 shows a schematic diagram of a system 4 according to an example embodiment, showing PCIs of cells of two DUs 410, 420 connected to the same CU-CP 400.

By way of example, FIG. 4 schematically shows parts of one base station, i.e. the distributed units DU1 410 and DU2 420 and the central unit-control plane CU-CP 400. DU1 410 and DU2 420 are connected to and/or controlled by CU-CP 400 via a respective interface 401, e.g. a respective F1-C interface. DU1 410 hosts and/or controls four cells having PCIs 1, 2, 3, and 4. Similarly, DU2 420 hosts and/or controls four cells having PCIs 999, 667, 4, and 28.

Additionally, FIG. 4 shows a UE 430 that has a connection 402 to DU1, or, to be more specific, to a cell of DU1. By way of example, it will be assumed that UE 430 is connected to a first cell 411 having PCI 4.

As described before, UE 430 may make measurements of signals from neighboring cells (also referred to as second cells), e.g. to enable to determine, e.g. DU1 410 and/or CU-CP 400, whether a cell change is to be done. Also as described before, reporting measurements and/or determining whether a cell change is to be done involves determining whether a second cell is an intra-DU cell, an inter-DU cell or an inter-base station cell with respect to the first cell.

However, only using the PCI of a second cell may, in some cases, not allow determining whether the second cell is an intra-DU cell, an inter-DU cell or an inter-base station cell with respect to the first cell. For example, cell 421 has the same PCI as cell 411 which is considered to be the first cell. Thus, in the given case, the PCI is ambiguous. This may for instance happen when PCI management and/or allocation in a first DU1 410 is independent from PCI management and/or allocation in a second DU2 420 and/or is done without using a static PCI list reservation across neighbouring DUs 410, 420.

Therefore, under various circumstances, it may be advantageous to obtain and/or provide a combination of a measured SSB that is associated with the PCI of a second cell and information related to the MGI of the second cell. The reason is that this combination may enable, e.g. a UE, a DU, a CU or another unit of a first base station, to determine whether the second cell is an intra-DU cell, an inter-DU cell or an inter-base station cell with respect to the first cell.

An example embodiment in an example scenario in which this advantage is particularly relevant due to PCI ambiguity will be described in more detail with reference to FIG. 5. However, before describing FIG. 5, the various example embodiments according to one or more example aspects will be described in more detail with reference to FIGS. 6 and 7.

Figure 6:
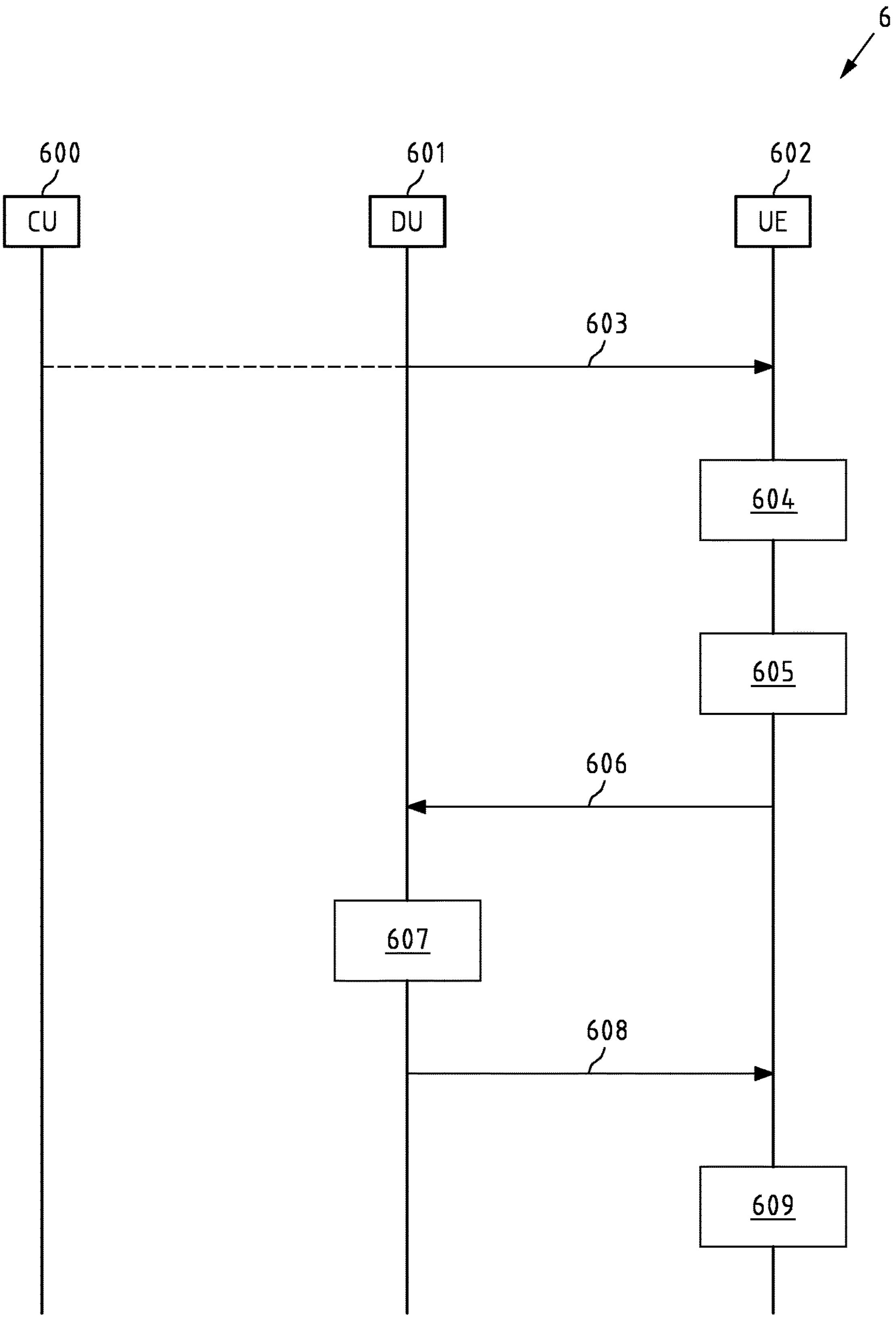
FIG. 6 example transmissions and example actions between a UE according to the first example aspect and a DU according to the second example aspect.

FIG. 6 shows example transmissions and example actions between a UE 602 according to the first example aspect and a DU 601 according to the second example aspect. The step and actions shown in chart 6 will now be described.

Step 603 involves transmitting and/or receiving configuration information for measuring at least part of a synchronization signal block (SSB) and/or a Channel State Information-Reference Signal (CSI-RS) associated with a physical cell ID (PCI) of a second cell and for observing information related to a mobility group indicator (MGI). At the time of the transmission and/or reception of the configuration information, the UE 602 may be connected to a first cell of the first DU 601. Accordingly, the configuration information may be transmitted by DU 601 and received by UE 602. However, in some cases it may originate from CU 600, as indicated by the dashed line to the left of the arrow of step 603. In such cases, the configuration information may be forwarded by DU 601 from CU 600 to UE 602.

Step 604 involves measuring the at least part of SSB and/or CSI-RS that is associated with the PCI.

Step 605 involves observing the information related to the MGI

The combination of the measured at least part of SSB and/or CSI-RS and the information related to the MGI enables to determine at least one of: whether the second cell is an intra-DU cell, an inter-DU cell or an inter-base station cell with respect to the first cell Further, optional step 606 involves reporting information based on the outcome of steps 604 and/or 605. It may be embodied in various manners which will be described below with their respective contexts.

Step 606-V1:

According to a first manner, the configuration information received in step 604 may have comprised information for the UE 602 for observing information related to a specific MGI associated with the PCI. Then, step 606 may involve reporting, to the first DU 601, information related to power of and/or an identity of the measured SSB, e.g. in case the UE 602 observed the specific MGI associated with the PCI.

Step 606-V2:

According to a second manner, the configuration information may have comprised information for the UE 602 for observing information related to a specific MGI associated with the PCI. Step 606 may then involve reporting, to the first DU 601, information related to power of and/or an identity of the measured SSB and/or CSI-RS and information related to power and/or a PCI measured in the course of observing the information related to the MGI associated with the specific PCI. This may be done to enable the first DU 601 to determine whether the second cell is at least one of: an intra-DU cell, an inter-DU cell or an inter-base station cell with respect to the first cell.

Step 606-V3:

Additionally or alternatively, step 606 may involve reporting, to the first DU 601, information identifying a MGI observed by the UE 602.

Step 606-V4:

According to a fourth manner, the UE 602 may perform a plurality of iterations of steps 604 and 605. Then, UE 602 may select, according to predefined rules, an observed power indicator value from a plurality of observed power indicator values associated with respective observed information related to a respective MGI. Step 606 may then involve reporting, to the first DU 601, information related to the selected observed power indicator value and information identifying the SSB and/or CSI-RS measured in the same iteration of the plurality of iterations as the selected observed power indicator value.

Next, Optional Step 607 May Comprise One or More of the Following Actions:

- determining, based at least on the information reported in step 606, whether the second cell is an intra-DU cell, an inter-DU cell or an inter-base station cell with respect to the first cell; and/or
- determining, based at least on the information reported in step 606, whether to transmit a cell change command to the UE 602.

If a cell change command is to be transmitted, e.g. because this was determined in optional step 607, a cell change command may be transmitted by the DU 601 and received by the UE 602 in optional step 608. The cell change command may comprise information indicating a PCI and information indicating a specific MGI associated with the PCI Optional step 609 may then involve identifying, based at least on the information indicating the PCI and on the information indicating the specific MGI associated with the PCI comprised in the cell change command, a target cell for a cell change. After that, UE 602 may perform a cell change to the target cell.

More detailed embodiments will now be described, inter alia with reference to FIGS. 5-7. In these more detailed embodiments, it will be assumed by way of example that a MGI is a channel state information-reference signal (CSI-RS) resource configuration and that base stations are embodied as respective gNBs. However, it is to be understood that this is merely an example and that the MGI and/or the base stations may be embodied differently.

The first more detailed embodiment described with reference to FIG. 6 relates to a UE that filters L1-RSRP measurements for L1/L2 mobility based on detection of MGI.

For this embodiment, it is assumed that the network to which CU 600, DU 601 and UE 602 belong configures a common CSI-RS reference signal transmission in all cells of a DU, e.g. of DU 601. Furthermore, it is assumed that the network ensures that the CSI-RS are different across DUs, e.g. different CSI-RS resources for cells being intra-DU, inter-DU and inter-gNB cells with respect to a first cell. It is noted that this assumption may also be used in any other embodiment described herein.

Against this background, the UE receives configuration information in step 603. More specifically, the TCI states configured for L1/L2 mobility and the reference signals configured for L1-RSRP measurements includes PCI of the SSB and also CSI-RS which is to be checked before reporting the cells in L1-RSRP measurement for L1/L2 mobility. This CSI-RS can be identified as MGI.

If the UE is not able to detect the CSI-RS (MGI) indicated in the configuration when measuring the SSB of PCI (steps 604 and 605), it will not report L1-RSRP of the PCI. In contrast, it may report L1-RSRP of the PCI if the UE 602 detected the MGI indicated in the configuration (step 606-V1). It is noted that this implies that CSI-RS resources can be only for that mobility group that has L1/L2 mobility enabled.

In this embodiment, SSB may be used to report L1 RSRP measurements in step 606. Mobility is also performed based on SSB measurements (step 607). CSI-RS is, e.g. only, used to identify the mobility group of the second cell, i.e. the measured cell, e.g. without reading the SIB.

The second more detailed embodiment described with reference to FIG. 6 relates to a serving DU 601 detecting a target cell based on L1-report on MGI/CSI-RS measurements.

In this embodiment, CU 600, in particular its CP, configures (step 603) UE 602 to report both SSB and CSI-RS while reporting L1 measurements of target beams. Next, UE 602 may measure SSB of a second cell in step 604 and observe information on a CSI-RS in step 605. As in the previous method, information reported on measured SSB may be used for mobility whereas information reported on observed CSI-RS may be used by DU 601 to identify MGI.

CU 600 may also share, with DU 601, the CSI-RS configuration of neighboring DUs of DU 601 to realize inter-DU L1/L2 mobility (sharing not shown in FIG. 6). The sharing may be done for instance using the F1 interface, e.g. F1: gNB-CU configuration update. It may enable DU 601, e.g. the serving gNB-DU, to distinguish, e.g. in step 607, intra-DU and inter-DU cell with inter-gNB cell based on L1-RSRP measurements reporting (step 606) SSB and CSI-RS measurements.

When MGI is configured by network, it is possible for the serving DU 601, e.g. in step 607, to differentiate whether reported target cell for L1/L2 mobility belongs to own cell-group or not without UE 602 filtering the L1-RSRP measurements as described with respect to the first detailed embodiment of FIG. 6 above.

As described before, step 606 relating to the reporting of SSB and CSI-RS by UE 602 may be embodied in various manners.

In an embodiment of step 606-V2, UE 602 may report L1-RSRP of SSB and L1-RSRP of CSI-RS it has detected on the PCI of the second cell. Then, DU 601 may decide based on these two reports whether UE 602 is detecting intra or inter-DU target cells and it can take a decision on triggering mobility based on whether reported CSI-RS is its own or other (step 607).

In an embodiment of step 606-V3, UE 602 may be configured in step 603 for CSI to report SSB-RI and its L1-RSRP. This report (step 606) can also include detected CRI of CSI-RS without L1-RSRP value. In this case only few bits might be needed to indicate the index of detected CSI-RS which is the MGI. However, a CRI field might possibly be needed in the uplink control information (UCI) content for indicating the index.

In an embodiment of step 606-V4, UE 602 can be configured in step 603 to report the L1-RSRP of the best CSI-RS it has detected in a plurality of iterations of steps 604 and 605 and to report a list of one or more resource-indicators pointing to a detected SSB. In this context, best CSI-RS may be understood as e.g. the CSI-RS for which a strongest power was observed.

The embodiments of steps 606-V3 and 606-V4 described above may be beneficial in that they may avoid the UE 602 making one or more complete measurements for SSB and MGI signal for RSRP reporting. The reason is that for the mobility purpose, the network may only need to know the mobility group that the target SSB (PCI) belongs to, not the actual measurements, e.g. in terms of RSRP.

The third more detailed embodiment described with reference to FIG. 6 illustrates PCI ambiguity resolution for L1/L2 mobility across inter-DU cells using MGI.

In this embodiment, the UE 602 is configured in step 603 with dedicated CSI-RS resource to report L1 measurements for a group of PCIs.

For example, referring to FIG. 4, there may be a CSI-RS resource 1 which is configured to be used with DU1 410 (PCI 1, 2, 3, 4) and there may be a CSI-RS resource 2 which is configured to be used with DU2 420 (PCI 4, 677, 999, 128).

Thus, even when there is PCI ambiguity among neighboring DUs, e.g. PCI 4 of a cell of DU1 410 and PCI 4 of a cell of DU2 420 in FIG. 4, a combination of a PCI and a CSI-RS resource may ensure that the UE can determine, e.g. identify, whether the target cell belongs to its mobility group, e.g. whether the PCI of the target cell is an intra-DU and/or inter-DU PCI.

Moreover, DU 601 can identify the second cell associated with the reported PCI based on the CSI-RS resource (step 607) and can take appropriate action based on the CSI-RS reported, e.g. initiate an intra or inter-DU cell change, e.g. in step 608.

Similarly, with unique CSI-RS configured as MGI across neighbouring cells, L3 measurements using RRC configuration can also make use of the CSI-RS associated with the target cell for PCI disambiguation instead of CGI reporting.

The fourth more detailed embodiment described with reference to FIG. 6 relates to a more detailed embodiment of step 608, i.e. a cell change command. In particular, it relates to L1/L2 cell switching modification to identify the right target beam (intra or inter-DU HO command at UE).

After the serving DU 601 sends MAC CE to actuate L1 cell change in step 608, the UE 602 may need to be able to identify whether the cell change was meant for intra-DU or inter-DU cell to avoid performing cell change to an incorrect cell/PCI.

Therefore, MAC CE which is used to deliver cell change command for L1/L2 based mobility, includes TCI state which includes PCI of SSB and also additional CSI-RS. This enables the UE 602 to associate the cell change command with the appropriate cell/PCI.

Moreover, UE 602 may consider the SSB for channel estimation which also have associated CSI-RS indicated in the TCI state. Thus, if the CSI-RS indicated in TCI state is not detected, the beam may be determined to be not suitable, e.g. by the UE 602. Accordingly, UE 602 may report the mismatch via MAC signaling as part of its measurement to the DU 601.

It is noted that an embodiment may be a combination of e.g. two or more of the more detailed embodiments above and that in particular the first more detailed embodiment may be considered for a scenario where only intra-DU use case is supported.

Now FIG. 7 will be described. FIG. 7 shows example transmissions and example actions between a UE 702 according to the first example aspect and a CU 700 according to the second example aspect. It is to be understood that messages between CU 700 and UE 702 may be forwarded by DU 701.

Overall, the steps shown in chart 7 are similar to those shown in chart 6. Nevertheless, a short description of the steps shown in FIG. 7 will now be given.

Step 703 involves transmitting and/or receiving configuration information for measuring at least part of a synchronization signal block (SSB) and/or a Channel State Information-Reference Signal (CSI-RS) associated with a physical cell ID (PCI) of a second cell and for observing information related to a mobility group indicator (MGI).

Step 704 involves measuring the at least part of SSB and/or CSI-RS that is associated with the PCI.

Step 705 involves observing the information related to the MGI, wherein a combination of the measured at least part of SSB and/or CSI-RS and the information related to the MGI enables to determine at least one of: whether the second cell is an intra-DU cell, an inter-DU cell or an inter-base station cell with respect to the first cell Optional step 706 involves reporting information based on and/or related to the outcome of steps 704 and/or 705.

Figure 7:
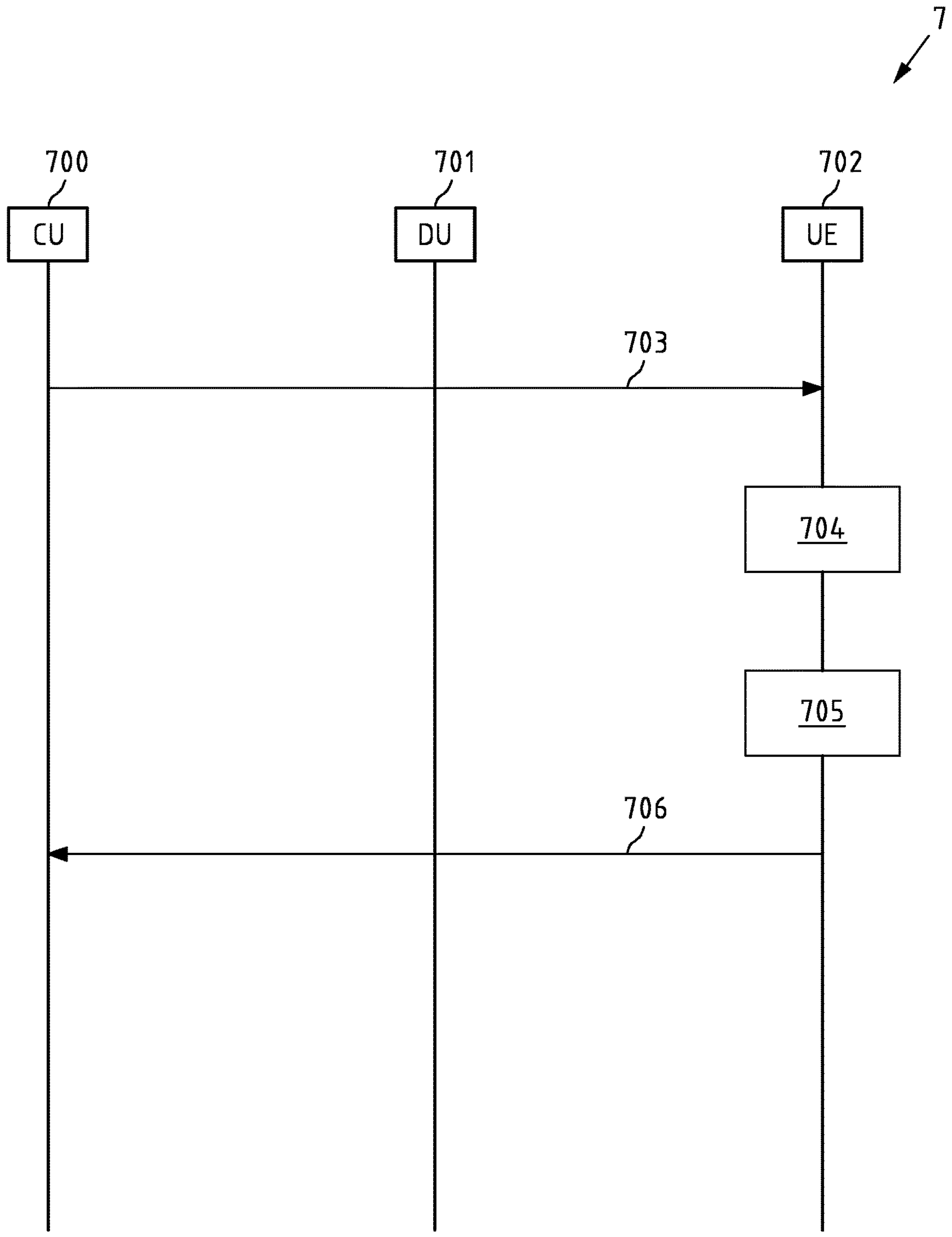
FIG. 7 example transmissions and example actions between a UE according to the first example aspect and a CU according to the second example aspect.

It can be seen that FIG. 7 differs from FIG. 6 in that the reporting in step 606 is from the UE 602 to the DU 601, whereas the reporting in step 706 is from the UE 702 to the DU 702. Thus, while step 606 may relate to reporting of layer 1/layer 2 (L1/L2) measurements, step 702 may relate to reporting of layer 3 (L3) measurements.

A more detailed embodiment of this is described with reference to FIG. 7 in the following. It relates to L3 measurement configuration and reporting with MGI. More specifically, it relates to filtering of inter-DU neighbours and reporting CSI-RS along with measurement result instead of CGI-report.

In step 703, the UE 702 receives a measurement object. The measurement object may comprise a list of PCIs for triggering measurement reports configured for SSB and CSI-RS of the target cells.

Next, UE 702 performs L3 measurements (step 704). While doing so, it checks for the CSI-RS configured for the PCI (MGI) (step 705) before accumulating the L3 measurement results. If CSI-RS given in the configuration is not detected, this cell is not reported over L3. Otherwise, the cell is reported over L3 in step 706.

In a further scenario where event-based measurements are configured for L1 measurements, the UE 702 may compare the configured CSI-RS of the serving cell and the measured cell to determine the MGI of the target cell.

It is noted that further steps may be included in the embodiment of FIG. 7, e.g. steps similar to 607, 608 and/or 609 described above. However, it is noted that a step similar to step 607 could be performed at CU 700 in FIG. 7 and that a step similar to step 608 could relate to a cell change command that is sent from the CU 700 to the UE 702.

Now example embodiments will be described with reference to FIG. 5. FIG. 5 shows a schematic diagram of a system 5 according to an example embodiment, showing PCIs of cells of two DUs 502, 512 connected to different CUs 501, 511.

Figure 5:
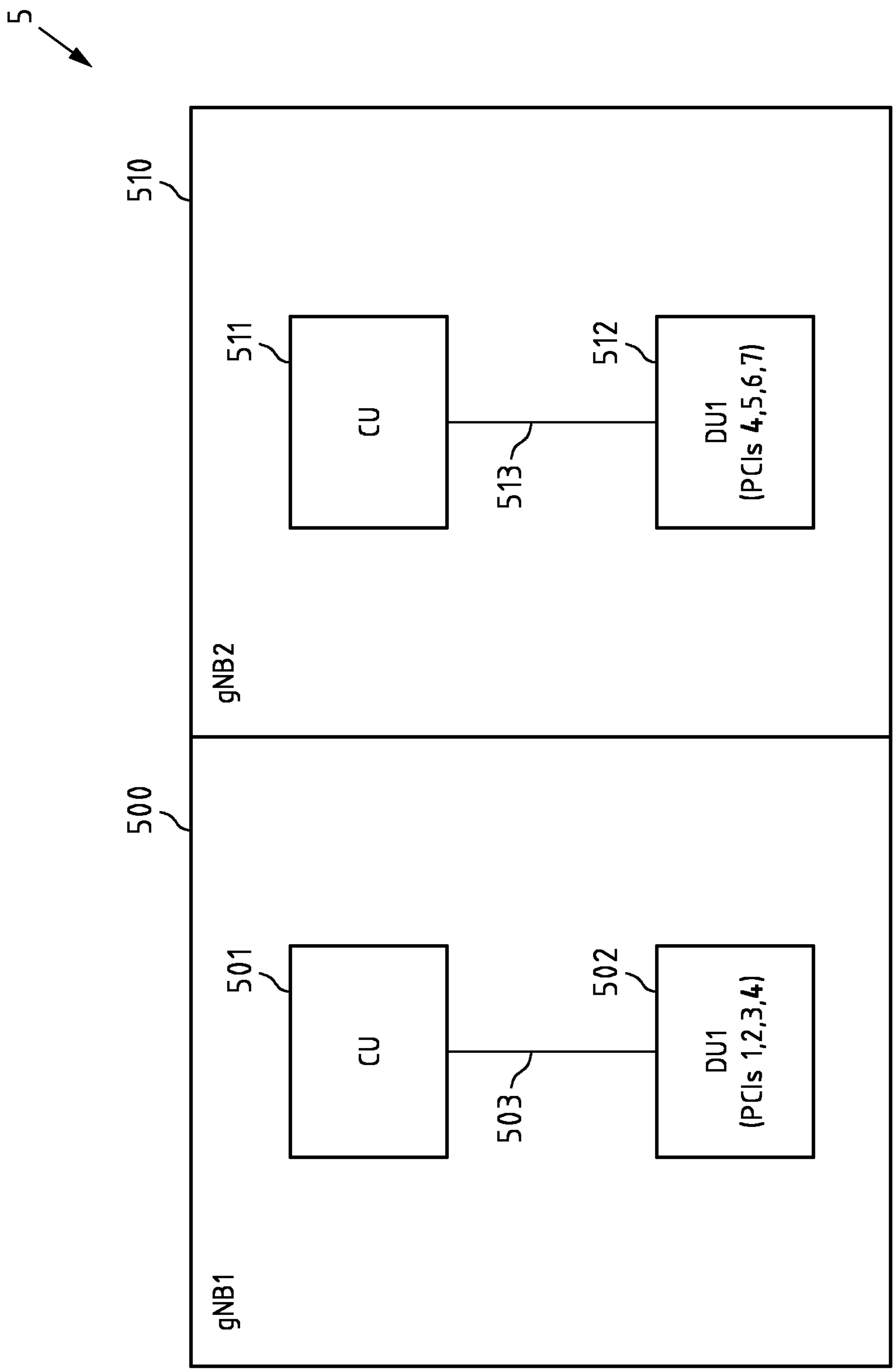
FIG. 5 a schematic diagram of a system according to an example embodiment, showing PCIs of cells of two DUs connected to different CUs.

CU 501 and DU1 502 are part of the same base station which is, by way of example, embodied as gNB1 500 in FIG. 5. They are connected by an interface 503, e.g. an F1 interface. DU1 502 hosts cells having PCIs 1, 2, 3, 4.

CU 511 and DU1 512 are part of the same base station which is, by way of example, embodied as gNB2 510 in FIG. 5. CU 511 and DU1 512 are connected by an interface 513, e.g. an F1 interface. DU2 512 hosts cells having PCIs 4, 5, 6, 7.

As suggested by the fact that both DU1 502 and DU2 512 host a cell having a PCI of 4, it can be seen that, by way of example, PCI assignment is not unique across DUs 502, 512 in the present embodiment. Instead, by way of example, each of the DUs 502, 512 assigns PCIs uniquely to its own cells only. Neighbouring DU will be configured with 'CSI-RS' which will be scheduled in the same relative location with respect to SSB, where neighbouring DU may be understood to be a DU which has at least one cell as a neighbour to a cell of a given DU. This CSI-RS which is otherwise called as third-symbol for cell detection/measurements may be scheduled e.g. only when there are active calls in any of serving cells of DU.

Due to the PCI ambiguity, a UE may determine, obtain and/or provide a combination of a measured SSB of a second cell and information related to a MGI of the second cell to enable identifying a second cell and/or determining whether a second cell is an intra-DU cell, an inter-DU cell or an inter-base station cell with respect to the first cell.

The UE enabling to determine whether a second cell is an intra-DU cell, an inter-DU cell or an in-ter-base station cell with respect to the first cell may for instance be used to limit the L1/L2 mobility within a DU.

To that end, a UE may receive configuration information for measuring one or more SSBs associated with PCIs of the set of PCIs comprising 1, 2, 3, 4, i.e. the PCIs of cells hosted by DU1 502. Additionally, the configuration information may indicate to the UE a specific MGI, e.g. a specific CSI-RS CSI-RS1, which is, e.g. uniquely, associated with DU1 502.

Then, when the UE measures SSB of any of the PCIs of the configured set of PCIs, it also checks the CSI-RS that is scrambled by same PCI. If CSI-RS1 is not detected, this PCI is not reported. On the other hand, if the UE detects the CSI-RS1, it reports the measurement to DU1 502.

Based on the reported measurement, DU1 502 may determine whether to initiate a cell change for the UE. When DU1 502 determines to initiate the cell change, it may send a cell change command to the UE. The cell change command may be a MAC CE indicating a TCI-state for switching and further comprising a CSI-RS-Index (1 or 2) for the UE to use the right PCI for target beam.

In addition to that, the UE enabling to determine whether a second cell is an intra-DU cell, an in-ter-DU cell or an inter-base station cell with respect to the first cell may also be used in the context of L3 measurements.

To that end, the UE may receive configuration information, e.g. a measurement object, for measuring one or more SSBs associated with a PCI of a potential target cell of a neighbor DU1 512. Additionally, the configuration information may indicate to the UE a specific MGI, e.g. a specific CSI-RS CSI-RS2, that is, e.g. uniquely, associated with the neighbor DU1 512.

When the UE performs L3 measurements of the SSB of the potential target cell it checks whether CSI-RS2 is present in the cell or not. If CSI-RS2 is not detected, this cell is not reported. This may avoid the reporting of L3 measurements of intra-DU cells to the control plane of CU 501.

In various embodiments, instead of CGI reporting, UE can additionally or alternatively be configured to report the observed CSI-RS to resolve PCI ambiguity. In this case the UE measures SSB and blindly detects one of CSI-RS configured for this purpose.

For the embodiments described above, it was assumed, by way of example, that the network to which CU 600, DU 601 and UE 602 belong configures a common CSI-RS reference signal transmission in all cells of a DU, e.g. of DU 601. Furthermore, it was assumed that the network ensures that the CSI-RS are different across DUs, e.g. different CSI-RS resources for cells being intra-DU, inter-DU and inter-gNB cells with respect to a first cell. Thus, the embodiments above were described in a context in which the first DU is one of a plurality of DUs, wherein a same MGI is used in all cells of the first DU, and wherein the MGI used in all cells of the first DU is different from all MGIs used in cells of one or more other DUs of the plurality of DUs that are adjacent to the first cell.

Figure 11:
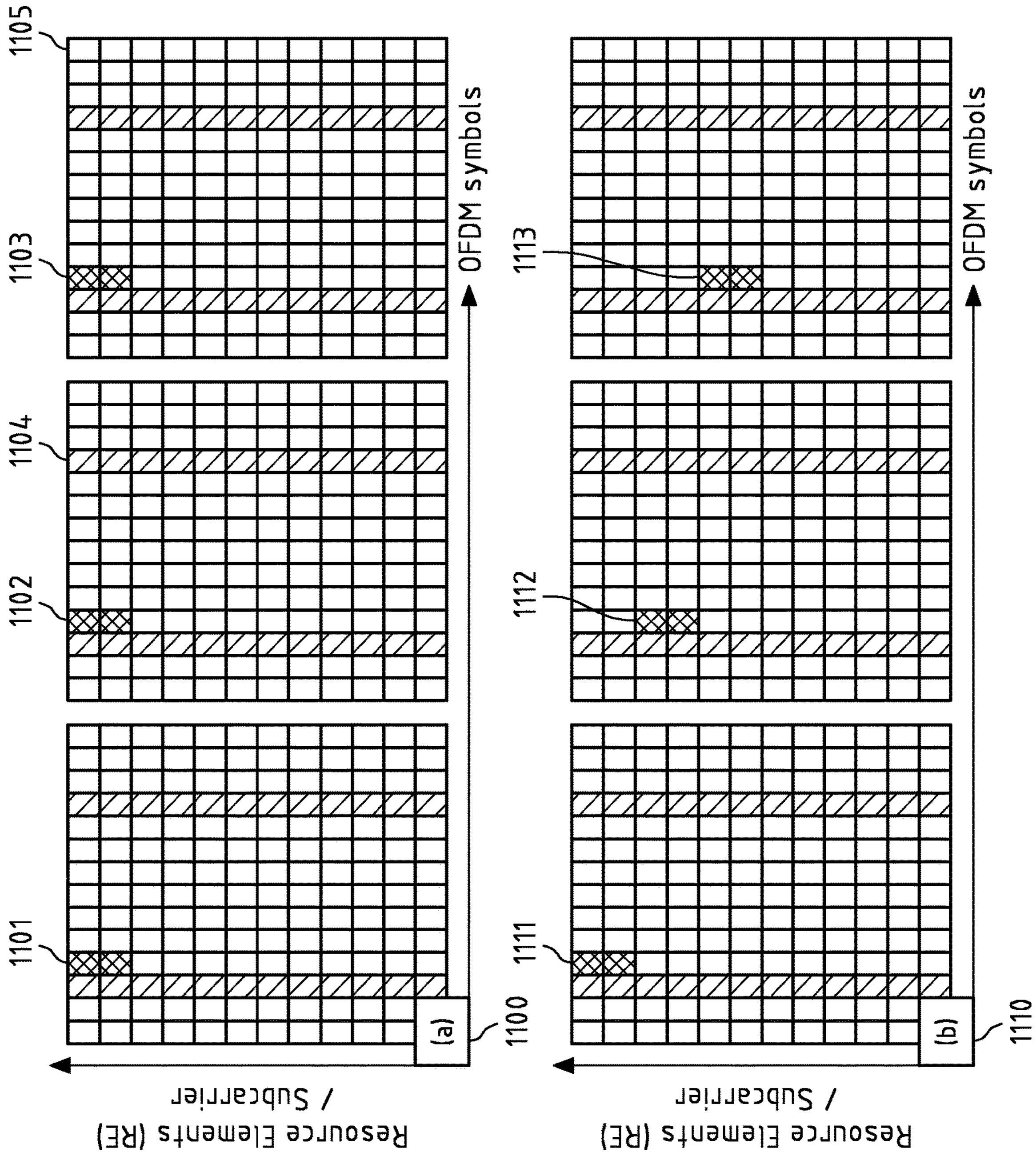
FIG. 11 two charts illustrating an example use of resource elements for CSI-RSs.

To illustrate this concept further, it will now be referred to FIG. 11. FIG. 11 shows two charts 1100, 110 illustrating an example use of resource elements for CSI-RSs. More specifically, each of these charts 1100, 1110 has a respective x-axis relating to resource elements (REs)/subcarriers and a respective y-axis relating to orthogonal frequency division multiplexing (OFDM) symbols.

Further, each chart contains three majors blocks (left, middle, right). Each major block represents resources of a respective cell. Thus, chart 1100 shows resources for three cells. Similarly, chart 1110 shows resources for three cells.

Each of the major blocks comprises smaller blocks. Blocks with a section lining like block 1105 relate to data. Blocks with a section lining like block 1104 relate to DM-RS. Blocks with a section lining like block 1101 relate to CSI-RS, in particular non-zero power (NZP)-CSI-RS.

For the description of FIG. 11, three cells are considered, e.g. having PCIs 1, 2 and 3. As can be seen in chart 1100, in the cell having PCI 1, the CSI-RS is transmitted in blocks 1101, in the cell having PCI 2, the CSI-RS is transmitted in blocks 1102, and in the cell having PCI, the CSI_RS is transmitted in blocks 1103.

In another option displayed in chart 1111, in the cell having PCI 1, the CSI-RS is transmitted in blocks 1101, in the cell having PCI 2, the CSI-RS is transmitted in blocks 1102, and in the cell having PCI, the CSI-RS is transmitted in blocks 1103.

To the question whether a network configuration may be required which assigns e.g. the CSI-RS configuration 1100, 1101, 1102 common to all cells of a DU, thus for DU1 PCI1, 2, 3 like this: PCI1 (left), PCI2 (middle), PCI3 (right) the following answer may be given. This is one possible option. As the CSI-RS is to identify the mobility group to differentiate the cells having same PCI, it can also share the same resource. UE will identify its group based on different signature of the CSI-RS. CSI-RS sequence can be used for this purpose. This is similar to SSB. SSB positions of neighbour cells need not be at different location.

Further, an assignment of the CSI-RS configuration different for all DUs of one gNB, thus for (all cells of) DU1 of gNB1 (block 1111 in left major block), for DU2 of gNB1 (block 1112 for center major block), and for DU3 of gNB2 (block 1113 for right major block) can be one example.

The following questions as to who is coordinating this may be considered: Do DU1 and DU2 inform CU1 of gNB1 of their CSI-RS configurations, and who is the master and who the slave, who assigns first, e.g. DU1 assigns common CSI-RS for PCI1, 2, 3, 4 and informs CU1 which then informs DU2 to assign a different CSI-RS config for PCI5, 6, 7, 8 (to avoid that DU1 and DU2 assign the same CSI-RS config)? Does gNB1 inform gNB2 of all CSI-RS configurations of all its DUs, e.g. DU1, DU2, and who is the master and who the slave, who assigns first, who second, e.g. to avoid that DU2 and DU3 get the same CSI-RS config assigned. And where does it stop as gNB3 has to be informed, gNB4, etc. and is this coordinated CSI-RS assignment done once during configuration of the gNBs and then kept?

The answer may be that the CU-CP notifies each DU of the CSI configurations of all the neighbouring DUs. More specifically, the following may be considered:

a. Each DU notifying CU-CP about the CSI-RS resource assigned for mobility group detection when L1/L2 based mobility is enabled in a DU. Alternatively, it could be signalled by the CU-CP also which reduces the scope for conflicts.
b. CU-CP ensuring that no two DUs select the same CSI resource configuration.

Only the neighbouring DUs may need to have or be configured to have different CSI-RS com-pared to the serving DU.

Furthermore, the questions may arise of how many different CSI-RS configurations are possible and, dependent on the answer, whether a suggested new flag: Resource-config-Mobility-group. (38.331)/Mobility Group Indicator (e.g. 1 bit) might not be enough to indicate which CSI-RS config has been assigned.

The answer to this is that a UE may need to understand the intra-DU and inter-DU measured cells. It may need to comprehend the CSI-RS configuration of all the DUs who has at least 1 cell preconfigured for L1/L2 mobility. This may need to be reported to the serving DU over L1 measurements.

The serving DU also may need to understand the measured cell and its corresponding DU (based on the CSI-RS indicated by the UE) to deliver inter-DU L1/L2 based serving cell change command.

The new field can be resource configuration or pointer to CSI-RS resource configuration defined already. If only one CSI-RS is configured for mobility group commonly 1 bit indicator in the report is sufficient.

The question may arise whether a neighbour cell measurement may be defined as that the network informs the UE the timing of neighbour cell SSBs via what's called SSB Measurement Timing Configuration (SMTC). UE will measure all SSBs that fall within a configured SMTC window. may include the Mobility Group Indicator, e.g. such that for making neighbour cell measurements, the network informs the UE the timing of neighbour cell SSBs (and their corresponding/related MGIs) via what's called SSB Measurement Timing Configuration (SMTC). UE will measure all SSBs (and check their corresponding/related MGIs) that fall within a configured SMTC window.

With regard to this, it is assumed in various embodiments that the UE refers to CSI measurement and reporting configuration where explicit locations are specified. SMTC is meant for L3 measurements when UE measure all beams of target cell for L3 measurement. UE provide CSI-Report based on report configuration. When a SSBRI is indicated in the report the UE also ensures that it has detected the mobility group for intra-DU mobility. For this purpose the CSI-RS measurements will be used as additional filtering criteria.

Furthermore, in various embodiments, L3 measurements also can make use of MGI (CSI-RS for mobility group) while reporting the measurements for the NW to identify the PCI collision based on this. This avoids the UE reading system information to report CGI to resolve PCI confusion.

Next, two embodiments will be described.

The first embodiments relates to filtering of SSB measurements based on CSI-RS measurement of mobility-group-indication CSI-RS. This is to limit the report of PCI which only belongs to own MG. It comprises:

1. Network configures UE with two Report configuration for reporting CSI-RS and SSB.
2. The report-config for SSB measurements indicate dependency to CSI-RS resource or report. Report-config include new flag: Resource-config-Mobility-group. (38.331)
3. When UE report SSB measurement as per the report config it checks whether CSI given in Resource-mobility-group is also visible. If not the UE will not report this SSB or report with lower measurement value. (38.214)

The Second Embodiment is with Modification to CSI Report Sent in PUCCH/PUSCH:

- Report-config is configured for CSI-RS measurement. But the UE is also asked to report the detected PCI on this CSI-RS.
- Report-config configured for SSB measurement also include new parameter detected-MGI-reporting. Here Report config may also include list of CSI-RS for this detection. TS38.331
  - Report config: New parameters: detected-MGI and list of CSI-RS for MGI. L1-RSRP measurement (38.214) will include new parameter. (38.214)
  - Detected CSI-RS-Resource-Indicator when SSBR1 is reported. (DCR1-Detected CS-RS-Resource-Indicator).
- UE behaviour for inclusion of DCR1 when report configuration is received for reporting detected MGI. (38.331 and 38.214).

Some Aspects Explained Above May be Summarized as Follows:

1. Transmission of common CSI-RS signal in all the beams of DU which is uniquely different from the common CSI-RS of other DU. This includes coordination of assigning different CSI-RS signals across DU via CU-DU signaling.
2. L1 measurements filters the SSB report based on detection of own CSI-RS to restrict the beam switching to right target cell of own DU.
3. L1 measurements enhanced to reported detected CSI-RS of other mobility group via new report configuration.
4. L3 measurement to make use of MGI instead of PCI of SIB3 in measurement report to resolve PCI confusion.

In the above description, several example embodiments were described, inter alia with regard to the receiving of configuration information for measuring at least part of a synchronization signal block (SSB) and/or a Channel State Information-Reference Signal (CSI-RS) signal associated with a physical cell ID (PCI) of a second cell. In the following, examples of a SSB and/or CSI-RS configuration for measurement purposes and further details will be given.

First, more details with regard to an inter-node resource coordination are given, as described in section 7.9 of TS37.340 v16.7.0 (2021 June) with regard to Inter-node Resource Coordination:

For MR-DC operations, MN and SN may coordinate their UL and DL radio resources in semi-static manner via UE associated signalling. The MN may coordinate its sidelink radio resources with the SN using the same UE associated signalling.

In EN-DC, CSI-RS based SgNB change between neighbour en-gNBs is supported by enabling that neighbour en-gNBs can exchange their own CSI-RS configurations and on/off status via the MeNB.

In NGEN-DC and NR-DC, CSI-RS based SN change between neighbour gNBs is supported by enabling that neighbour gNBs can exchange their own CSI-RS configurations and on/off status via the MN.

Next, more details with regard to an example of Cell Global Identity (CGI) reporting are given.

For the purpose of ANR (Automatic Neighbour Relations), the network may configure the UE to decode and report Cell Global Identity (CGI) for a set of cells. The field cellForWhichToReportCGI may inform the UE about the Physical Cell Identity (PCI) for which CGI is to be reported.

In the following, example details of a measurement object are given.

In this example, the information element (IE) MeasObjectNR provides information applicable for SSB based and/or CSI-RS based intra/inter-frequency measurements.

The following table presents the configuration provided by MeasObjectNR.

| MeasObjectNR | |
|---|---|
| ssbFrequency | ARFCN-ValueNR - INTEGER (0 . . . 3279165) |
| ssbSubcarrierSpacing | ENUMERATED {kHz 15, kHz 30, kHz 60, kHz 120, kHz 240} |
| smtc1 | SSB-MTC |
| smtc2 | SSB-MTC2 |
| refFreqCSI-RS | ARFCN-ValueNR - INTEGER (0 . . . 3279165) |
| referenceSignalConfig | Reference signal configuration for SSB and CSI-RS |
| absThreshSS-BlocksConsolidation | ThresholdNR - INTEGER (0 . . . 127) |
| absThreshCSI-RS-Consolidation | ThresholdNR - INTEGER (0 . . . 127) |
| nrofSS-BlocksToAverage | INTEGER (2 . . . 16) |
| nrofCSI-RS-ResourcesToAverage | INTEGER (2 . . . 16) |

-continued

| MeasObjectNR | |
|---|---|
| quantityConfigIndex | INTEGER (1 . . . 2) |
| offsetMO | SSB and CSI-RS offset values (RSRP, RSRQ and SNR) |
| cellsToRemoveList | A list of PCIs (PCI-List) |
| cellsToAddModList | List of cells to add/modify -> PCI and Cell-individual offsets |

In the following, example details relating to configurations relating to CSI are given, as described also in TS38.331 v16.50 (2021 June), in particular in Section 6.3.2 RRC IE.

CSI-MeasConfig:

The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. See also TS 38.214, clause 5.2

CSI-ReportConfig:

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214, clause 5.2.1.

CSI-ResourceConfig:

The IE CSI-ResourceConfig defines a group of one or more NZP-CSI-RS-ResourceSet, CSI-IM-ResourceSet and/or CSI-SSB-ResourceSet.

The CSI-ResourceConfig information element may be defined as shown by the following pseudo-code:

```
-- ASN1START
-- TAG-CSI-RESOURCECONFIG-START
CSI-ResourceConfig ::=                SEQUENCE {
   csi-ResourceConfigId                  CSI-ResourceConfigId,
   csi-RS-ResourceSetList                CHOICE {
      nzp-CSI-RS-SSB                        SEQUENCE {
         nzp-CSI-RS-ResourceSetList            SEQUENCE (SIZE
(1..maxNrofNZP-CSI-RS-ResourceSetsPerConfig)) OF NZP-CSI-RS-
ResourceSetId
OPTIONAL, -- Need R
         csi-SSB-ResourceSetList               SEQUENCE (SIZE
(1..maxNrofCSI-SSB-ResourceSetsPerConfig)) OF CSI-SSB-ResourceSetId
OPTIONAL -- Need R
      },
      csi-IM-ResourceSetList                SEQUENCE (SIZE (1..maxNrofCSI-
IM-ResourceSetsPerConfig)) OF CSI-IM-ResourceSetId
   },
   bwp-Id                                BWP-Id,
   resourceType                          ENUMERATED { aperiodic,
semiPersistent, periodic },
   ...
}
-- TAG-CSI-RESOURCECONFIG-STOP
-- ASN1STOP
```

| CSI-ResourceConfig field descriptions |
|---|
| bwp-Id |
| The DL BWP which the CSI-RS associated with this CSI-ResourceConfig are located in (see TS 38.214 [19], clause 5.2.1.2. |
| csi-IM-ResourceSetList |
| List of references to CSI-IM resources used for CSI measurement and reporting in a CSI-RS resource set. Contains up to maxNrofCSI-IM-ResourceSetsPerConfig resource sets if resource Type is 'aperiodic' and 1 otherwise (see TS 38.214 [19], clause 5.2.1.2). |
| csi-ResourceConfigId |
| Used in CSI-ReportConfig to refer to an instance of CSI-ResourceConfig. |
| csi-SSB-ResourceSetList |
| List of references to SSB resources used for CSI measurement and reporting in a CSI-RS resource set (see TS 38.214 [19], clause 5.2.1.2). |
| nzp-CSI-RS-ResourceSetList |
| List of references to NZP CSI-RS resources used for beam measurement and reporting in a CSI-RS resource set. Contains up to maxNrofNZP-CSI-RS-ResourceSetsPerConfig resource sets if resource-Type is 'aperiodic' and 1 otherwise (see TS 38.214 [19], clause 5.2.1.2). |

-continued

| CSI-ResourceConfig field descriptions |
| --- |
| resourceType |
| Time domain behavior of resource configuration (see TS 38.214 [19], clause 5.2.1.2). It does not apply to resources provided in the csi-SSB-ResourceSetList. |

CSI-RS-ResourceConfigMobility:

The IE CSI-RS-ResourceConfigMobility is used to configure CSI-RS based RRM measurements.

Next, example details relating to the UE procedure for receiving reference signals are given, as described in Sections 5.1.6.1-5.1.6.3 of TS38.214 v16.7.0 (2021 September):

5.1.6.1 CSI-RS Reception Procedure

The CSI-RS defined in Clause 7.4.1.5 of TS 38.211, may be used for time/frequency tracking, CSI computation, L1-RSRP computation, L1-SINR computation and mobility.

For a CSI-RS resource associated with a NZP-CSI-RS-ResourceSet with the higher layer parameter repetition set to 'on', the UE shall not expect to be configured with CSI-RS over the symbols during which the UE is also configured to monitor the CORESET, while for other NZP-CSI-RS-ResourceSet configurations, if the UE is configured with a CSI-RS resource and a search space set associated with a CORESET in the same OFDM symbol(s), the UE may assume that the CSI-RS and a PDCCH DM-RS transmitted in all the search space sets associated with CORESET are quasi co-located with 'typeD', if 'typeD' is applicable. This also applies to the case when CSI-RS and the CORESET are in different intra-band component carriers, if 'typeD' is applicable. Furthermore, the UE shall not expect to be configured with the CSI-RS in PRBs that overlap those of the CORESET in the OFDM symbols occupied by the search space set(s).

5.1.6.1.2 CSI-RS for L1-RSRP and L1-SINR computation

If a UE is configured with a NZP-CSI-RS-ResourceSet configured with the higher layer parameter repetition set to 'on', the UE may assume that the CSI-RS resources, described in Clause 5.2.2.3.1, within the NZP-CSI-RS-ResourceSet are transmitted with the same downlink spatial domain transmission filter, where the CSI-RS resources in the NZP-CSI-RS-ResourceSet are transmitted in different OFDM symbols. If repetition is set to 'off', the UE shall not assume that the CSI-RS resources within the NZP-CSI-RS-ResourceSet are transmitted with the same downlink spatial domain transmission filter.

If the UE is configured with a CSI-ReportConfig with reportQuantity set to 'cri-RSRP', 'cri-SINR' or 'none' and if the CSI-ResourceConfig for channel measurement (higher layer parameter resourcesForChannelMeasurement) contains a NZP-CSI-RS-ResourceSet that is configured with the higher layer parameter repetition and without the higher layer parameter trs-Info, the UE can only be configured with the same number (1 or 2) of ports with the higher layer parameter nrofPorts for all CSI-RS resources within the set. If the UE is configured with the CSI-RS resource in the same OFDM symbol(s) as an SS/PBCH block, the UE may assume that the CSI-RS and the SS/PBCH block are quasi co-located with 'typeD' if 'typeD' is applicable. Furthermore, the UE shall not expect to be configured with the CSI-RS in PRBs that overlap with those of the SS/PBCH block, and the UE shall expect that the same subcarrier spacing is used for both the CSI-RS and the SS/PBCH block.

5.1.6.1.3 CSI-RS for Mobility

If a UE is configured with the higher layer parameter CSI-RS-Resource-Mobility and the higher layer parameter associatedSSB is not configured, the UE shall perform measurements based on CSI-RS-Resource-Mobility and the UE may base the timing of the CSI-RS resource on the timing of the serving cell.

If a UE is configured with the higher layer parameters CSI-RS-Resource-Mobility and associatedSSB, the UE may base the timing of the CSI-RS resource on the timing of the cell given by the cellId of the CSI-RS resource configuration. Additionally, for a given CSI-RS resource, if the associated SS/PBCH block is configured but not detected by the UE, the UE may not be required to monitor the corresponding CSI-RS resource. The higher layer parameter isQuasiColocated indicates whether the associated SS/PBCH block given by the associatedSSB and the CSI-RS resource(s) are quasi co-located with respect to 'typeD', when applicable.

If a UE is configured with the higher layer parameter CSI-RS-Resource-Mobility and with periodicity greater than 10 msec in paired spectrum, the UE may assume the absolute value of the time difference between radio frame i between any two cells, listed in the configuration with the higher layer parameter CSI-RS-CellMobility and with same refFreqCSI-RS, is less than 153600 Ts.

Additionally, example details relating to the UE procedure for reporting channel state information (CSI) are given, as also described in Section 5.2.1 of TS38.214 v16.7.0 (2021 September):

The procedures on aperiodic CSI reporting described in this clause assume that the CSI reporting is triggered by DCI format 0_1, but they equally apply to CSI reporting triggered by DCI format 0_2, by applying the higher layer parameter reportTriggerSizeDCI-0-2 instead of reportTrigger-Size.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP or L1-SINR.

For CQI, PMI, CRI, SSBRI, LI, RI, L1-RSRP, L1-SINR a UE is configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

Next, example details relating to mobility and state transitions, as described also in Section 9.1 of TS38.300 v16.6.0 (2021 June), will be described.

Load balancing is achieved in NR with handover, redirection mechanisms upon RRC release and through the usage of inter-frequency and inter-RAT absolute priorities and inter-frequency Qoffset parameters.

Measurements to be performed by a UE for connected mode mobility are classified in at least four measurement types:

Intra-frequency NR measurements;

Inter-frequency NR measurements;

Inter-RAT measurements for E-UTRA;

Inter-RAT measurements for UTRA.

For each measurement type one or several measurement objects can be defined (a measurement object defines e.g. the carrier frequency to be monitored).

For each measurement object one or several reporting configurations can be defined (a reporting configuration defines the reporting criteria). Three reporting criteria are used: event triggered reporting, periodic reporting and event triggered periodic reporting.

The association between a measurement object and a reporting configuration is created by a measurement identity (a measurement identity links together one measurement object and one reporting configuration of the same RAT). By using several measurement identities (one for each measurement object, reporting configuration pair) it is then possible to:

Associate several reporting configurations to one measurement object and;

Associate one reporting configuration to several measurement objects.

The measurements identity is used as well when reporting results of the measurements.

Measurement quantities are considered separately for each RAT.

Measurement commands are used by NG-RAN to order the UE to start, modify or stop measurements.

Handover can be performed within the same RAT and/or CN, or it can involve a change of the RAT and/or CN.

In the NG-C signalling procedure, the AMF based on support for emergency services, voice service, any other services or for load balancing etc, may indicate the target CN type as EPC or 5GC to the gNB node. When the target CN type is received by gNB, the target CN type is also conveyed to the UE in RRCRelease Message.

Inter-gNB CSI-RS based mobility, i.e. handover, is supported between two neighbour gNBs by enabling that neighbour gNBs can exchange and forward their own CSI-RS configurations and on/off status.

Further, the same document TS38.300 v16.6.0 (2021 June) also describes example details relating to inter node discovery in Section 4.7.4.6, as reproduced below:

Inter node discovery is supported via SSB-based and/or CSI-RS-based measurements. An IAB-node can be configured to transmit and receive off synchronization raster SSB signals to dis-cover neighboring IAB-nodes. The configuration is not expected to create a conflict between IAB-DU SSB transmission and IAB-MT SSB measurement windows.

Figure 8:
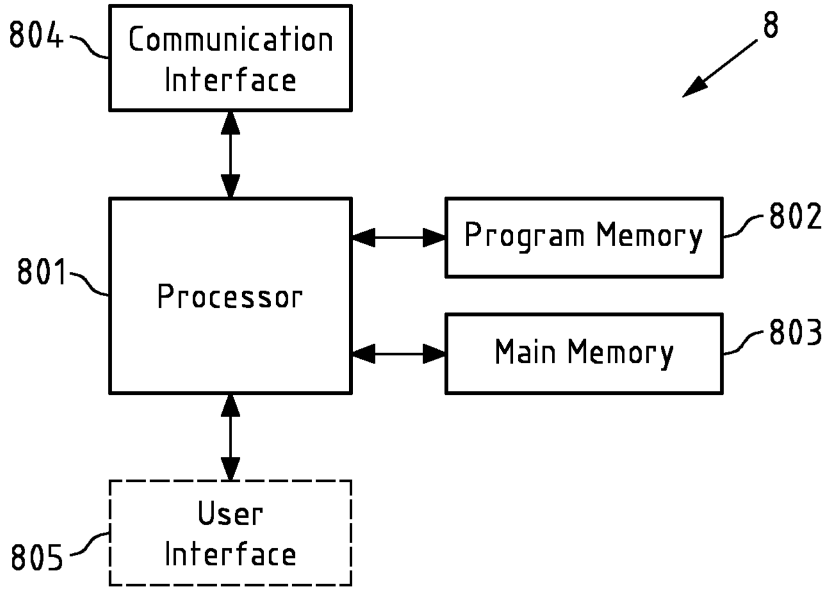
FIG. 8 a schematic block diagram of an apparatus according to an example embodiment of the first or second example aspect.
Figure 9:
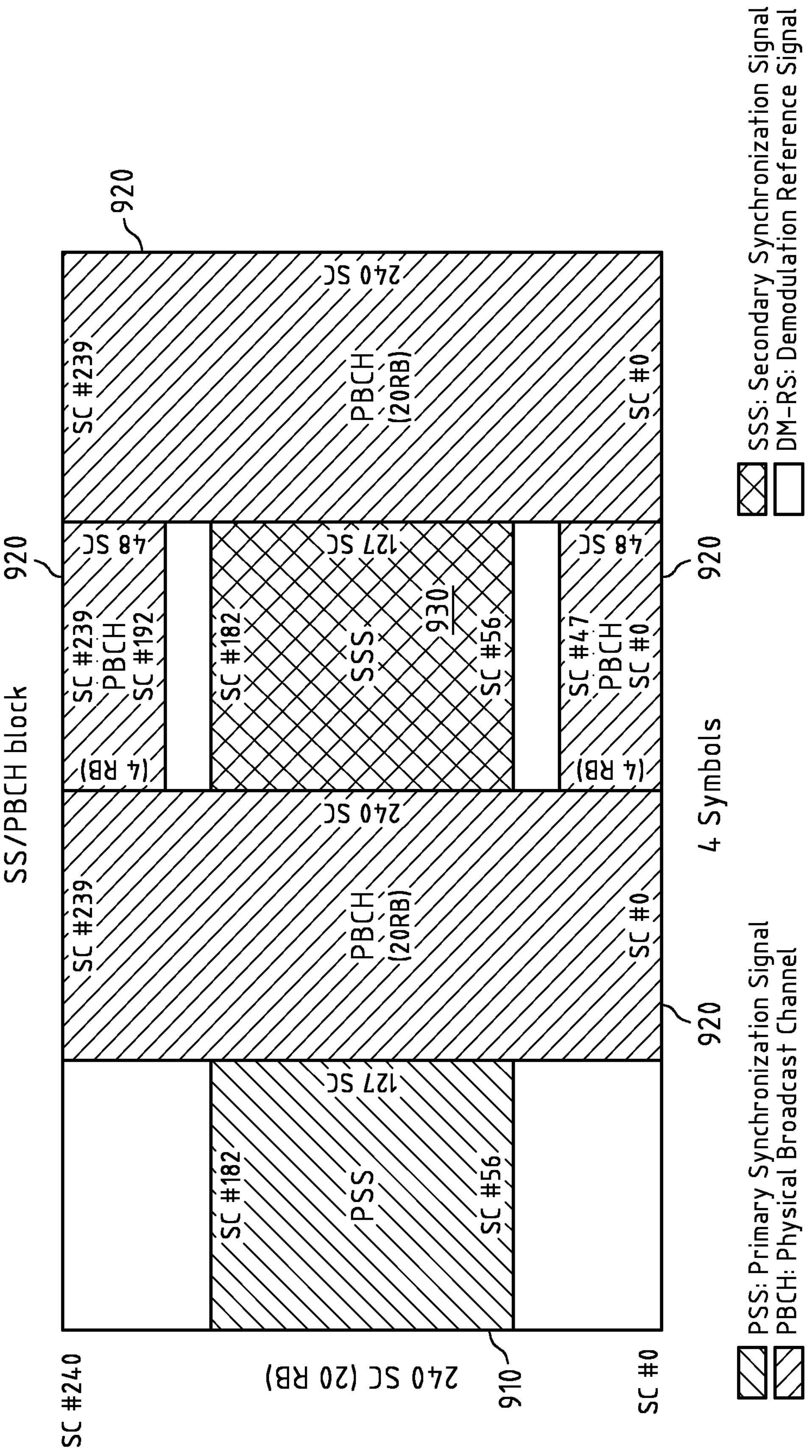
FIG. 9 an example of a SSB.
Figure 10:
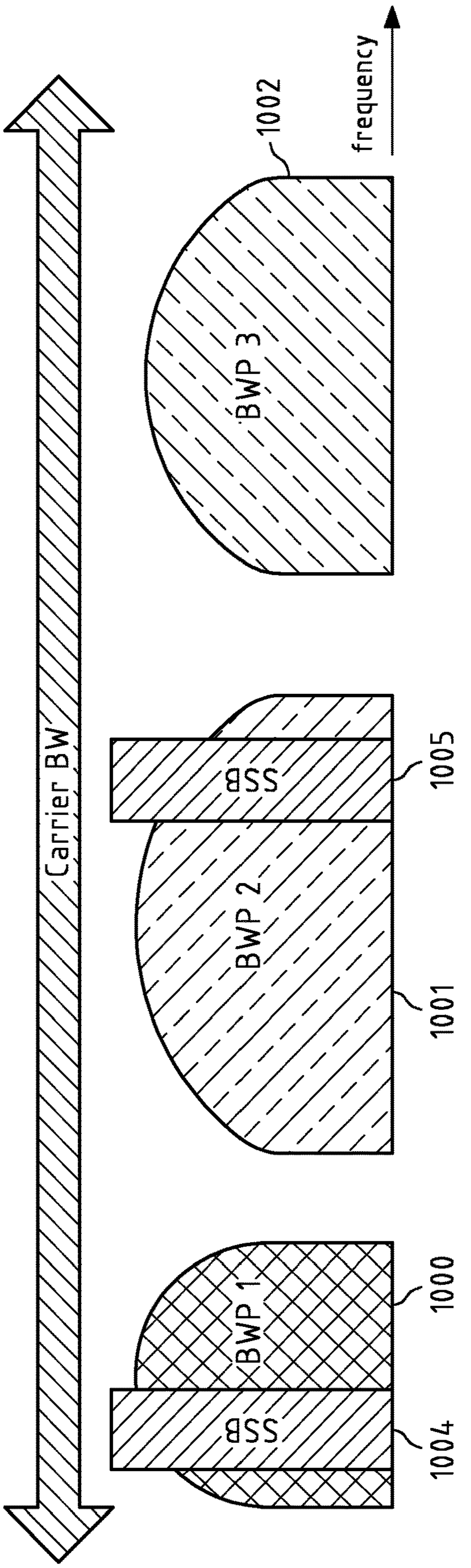
FIG. 10 an example of how SSBs can be positioned in frequency domain.

It will be referred to FIG. 8 now. FIG. 8 shows a schematic block diagram of an apparatus 8 according to an example embodiment of the first or second example aspect. The apparatus 8 may be a UE, a DU, a CU and/or a network node, e.g. comprising a DU and/or CU.

Apparatus 8 comprises a processor 801, a program memory 802, a main memory 803, a communication interface 804, and optionally user interface 805, in particular when the apparatus 8 is a UE. In various embodiments, the apparatus 8 comprises further units, parts or structural and/or functional elements.

Apparatus 8 may for instance be configured to perform and/or control or comprise respective means (at least one of 801 to 805) for performing and/or controlling and/or configured to perform the method according to one or more example aspects. Apparatus 8 may as well be an apparatus comprising at least one processor 801 and at least one memory 803 including computer program code, the at least one memory 803 and the computer program code configured to, with the at least one processor 801, cause an apparatus, e.g. apparatus 8 at least to perform and/or control the method according to one or more example aspects.

Processor 801 may for instance further control the memories 802, 803, the communication interface 805, and the optional user interface 805.

Furthermore, processor 801 may for instance execute computer program code stored in program memory 802, which may for instance represent a computer readable storage medium comprising program code that, when executed by processor 801, causes the processor 801 to perform the method according to one or more example aspects.

Processor 801 (and also any other processor mentioned in this specification) may be a processor of any suitable type. Processor 801 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware may be programmed in such a way to carry out the described function. Processor 801 may for instance be an application processor that runs an operating system.

Program memory 802 may also be separate from or included in processor 801. This memory may for instance be fixedly connected to processor 801, or be at least partially removable from processor 801, for instance in the form of a memory card or stick. Program memory 802 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 802 may also comprise an operating system for processor 801. Program memory 802 may also comprise a firmware for apparatus 8.

Apparatus 8 comprises a working memory 803, for instance in the form of a volatile memory. It may for instance be a Random Access Memory (RAM) or Dynamic RAM (DRAM), to give but a few non-limiting examples. It may for instance be used by processor 801 when executing an operating system and/or computer program.

The communication interface 804 may enable the apparatus 8 to communicate with other entities. The communication interface 804 may for instance comprise a wireless interface, e.g. a cellular radio communication interface and/or a WLAN interface and/or a wire-bound interface, e.g. an IP-based interface, for instance to communicate with entities via the Internet. User interface 805 is optional and may comprise a display for displaying information to a user and/or an input device (e.g. a keyboard, keypad, touchpad, mouse, etc.) for receiving information from a user.

Some or all of the components of the apparatus 8 may for instance be connected via a bus. Some or all of the components of the apparatus 8 may for instance be combined into one or more modules.

Figure 12:
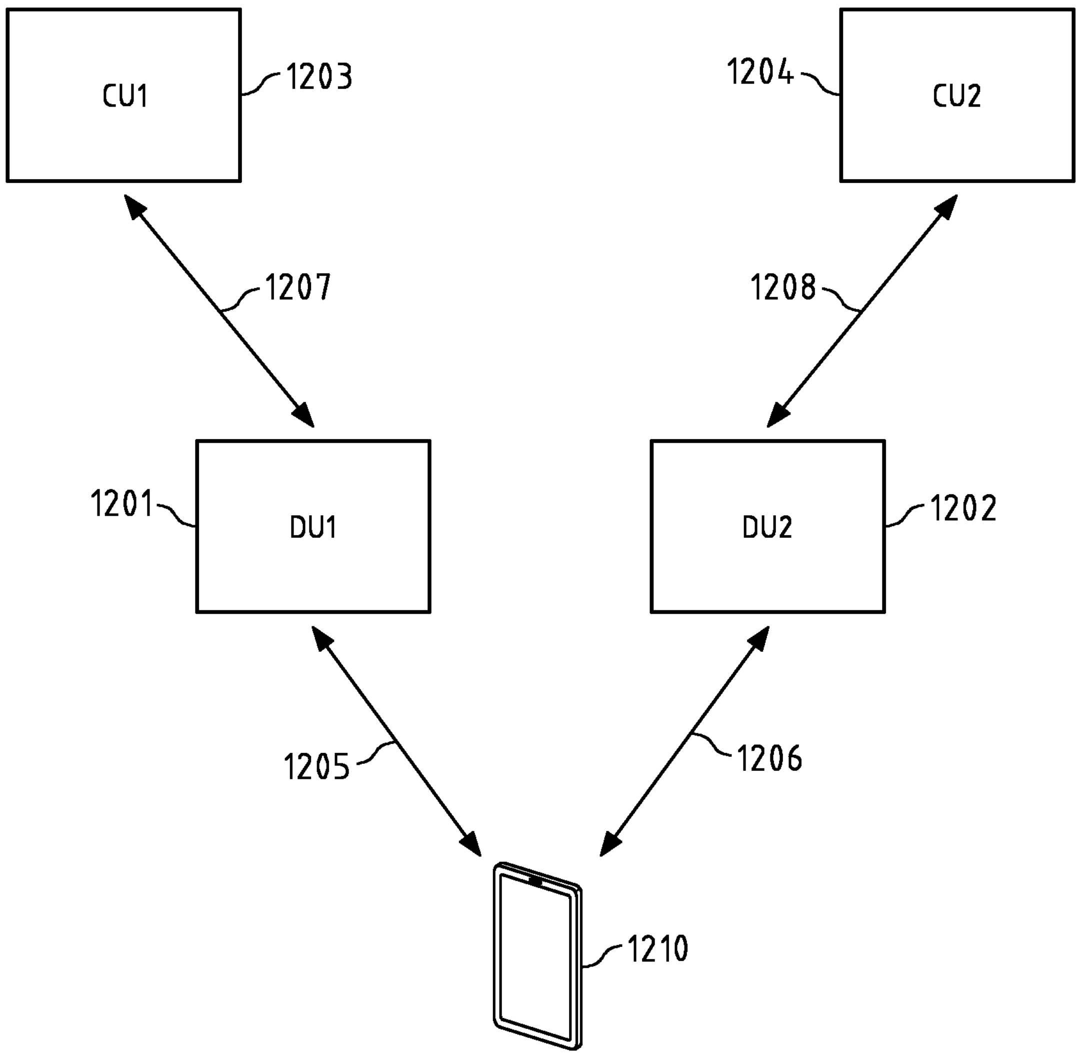
FIG. 12 a block diagram illustrating L2/L3 signaling.

FIG. 12 is a block diagram illustrating L2/L3 signaling, based on the examples described herein. In FIG. 12, the first network node 1201 supports a Distribution Unit functionality and/or L2 processing, the third network node 1203 provides a Central Unit functionality and/or L3 processing, the second network node 1202 provides a Distribution Unit functionality and/or L2 processing, and the fourth network node 1204 provides a Central Unit functionality and/or L3 processing. The first network node 1201 may be the network node of a serving cell. The second network node 1202 may be the network node of a neighbour, non-serving cell. Connections 1205, 1206, 1207, 1208 may refer to measurements, exchange of messages and/or reporting.

The following description may provide further details of alternatives, modifications and variances of a base station embodied e.g. as a gNB: A gNB comprises e.g. a node providing NR user plane and control plane protocol terminations towards the UE, and connected via the NG interface to the 5GC, e.g. according to 3GPP TS 38.300 V16.6.0 (2021 June) section 3.2 incorporated by reference.

A gNB Central Unit (gNB-CU) comprises e.g. a logical node hosting e.g. RRC, SDAP and PDCP protocols of the gNB or RRC and PDCP protocols of the en-gNB that controls the operation of one or more gNB-DUs. The gNB-CU terminates the F1 interface connected with the gNB-DU.

A gNB Distributed Unit (gNB-DU) comprises e.g. a logical node hosting e.g. RLC, MAC and PHY layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU.

A gNB-CU-Control Plane (gNB-CU-CP) comprises e.g. a logical node hosting e.g. the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

A gNB-CU-User Plane (gNB-CU-UP) comprises e.g. a logical node hosting e.g. the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU, e.g. according to 3GPP TS 38.401 V16.6.0 (2021 July) section 3.1 incorporated by reference.

Different Functional Splits Between the Central and Distributed Unit are Possible, e.g. Called Options:

Option 1 (1A-Like Split)

- The function split in this option is similar as 1A architecture in DC. RRC is in the central unit. PDCP, RLC, MAC, physical layer and RF are in the distributed unit.

Option 2 (3C-Like Split)

- The function split in this option is similar as 3C architecture in DC. RRC, PDCP are in the central unit. RLC, MAC, physical layer and RF are in the distributed unit.

Option 3 (Intra RLC Split)

- Low RLC (partial function of RLC), MAC, physical layer and RF are in the distributed unit. PDCP and high RLC (the other partial function of RLC) are in the central unit.

Option 4 (RLC-MAC Split)

- MAC, physical layer and RF are in the distributed unit. PDCP and RLC are in the central unit.

Or else, e.g. according to 3GPP TR 38.801 V14.0.0 (2017 March) section 11 incorporated by reference.

A gNB supports different protocol layers, e.g. Layer 1 (L1), Layer 2 (L2), Layer 3 (L3).

Layer 1 (L1)—Physical Layer.

The layer 2 (L2) of NR is split into the following sublayers: Medium Access Control (MAC), Radio Link Control (RLC), Packet Data Convergence Protocol (PDCP) and Service Data Adaptation Protocol (SDAP), where e.g.:

- The physical layer offers to the MAC sublayer transport channels;
- The MAC sublayer offers to the RLC sublayer logical channels;
- The RLC sublayer offers to the PDCP sublayer RLC channels;
- The PDCP sublayer offers to the SDAP sublayer radio bearers;
- The SDAP sublayer offers to 5GC QoS flows;
- Comp. refers to header compression and segm. to segmentation;
- Control channels (BCCH, PCCH).

Layer 3 (L3) includes e.g. Radio Resource Control (RRC), e.g. according to 3GPP TS 38.300 V16.6.0 (2021 June) section 6 incorporated by reference.

A RAN (Radio Access Network) node or network node like e.g. a gNB, base station, gNB CU or gNB DU or parts thereof may be implemented using e.g. an apparatus with at least one processor and/or at least one memory (with computer-readable instructions (computer program)) configured to support and/or provision and/or processing of CU and/or DU related functionality and/or features, and/or at least one protocol (sub-) layer of a RAN (Radio Access Network), e.g. layer 2 and/or layer 3.

The gNB CU and gNB DU parts may e.g. be co-located or physically separated. gNB DU may even be split further, e.g. into two parts, e.g. one including processing equipment and one including an antenna. A Central Unit (CU) may also be called BBU/REC/RCC/C-RAN/V-RAN, O-RAN, or part thereof. A Distributed Unit (DU) may also be called RRH/RRU/RE/RU, or part thereof.

gNB-DU supports one or multiple cells, and could thus serve as e.g. a serving cell for user equipment (UE).

A user equipment (UE) may include a wireless or mobile device, an apparatus with a radio interface to interact with a RAN (Radio Access Network), a smartphone, an in-vehicle apparatus, an IoT device, a M2M device, or else. Such UE or apparatus may comprise: at least one processor; and at least one memory including computer program code; wherein the at least one memory and the computer program code are configured to, with the at least one processor, cause the apparatus at least to perform certain operations, like e.g. RRC connection to the RAN. A UE is e.g. configured to generate a message (e.g. including a cell ID) to be transmitted via radio towards a RAN (e.g. to reach and communicate with a serving cell). A UE may generate and transmit and receive RRC messages containing one or more RRC PDUs (Packet Data Units).

The UE may have different states (e.g. according to 3GPP TS 38.331 V16.5.0 (2021 June) sections 42.1 and 4.4, incorporated by reference).

A UE is e.g. either in RRC_CONNECTED state or in RRC_INACTIVE state when an RRC connection has been established.

In RRC_CONNECTED State a UE May:

- store the AS context;
- transfer of unicast data to/from UE;
- Monitor control channels associated with the shared data channel to determine if data is scheduled for it;
- provide channel quality and feedback information;
- perform neighboring cell measurements and measurement reporting;

The RRC Protocol Includes e.g. The Following Main Functions:

- RRC connection control:
- Measurement configuration and reporting:
- Establishment/modification/release of measurement configuration (e.g. intra-frequency, inter-frequency and inter-RAT measurements);
- Setup and release of measurement gaps;
- Measurement reporting.

The expression "A and/or B" is considered to comprise any one of the following three scenarios: (i) A, (ii) B, (iii) A and B. The expression "A or B" is considered to explicitly disclose at least the following two scenarios: (i) either A or B, (ii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only examples, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature which cannot be omitted or substituted.

The sequence of method steps presented above, e.g. in the flowcharts, is not mandatory, also alternative sequences may be possible. Nevertheless, the specific sequence of method steps exemplarily shown in the figures shall be considered as one possible sequence of method steps for the respective embodiment described by the respective figure. Further, in various embodiments, a step of a sequence may trigger another step of the sequence, for instance the following step in the sequence.

Further, the Following Embodiments are Disclosed:

Embodiment 1

A method, e.g. performed by a user equipment (UE) connected to a first cell of a first distributed unit (DU) of a first base station, the method comprising:

- receiving configuration information for measuring at least part of a synchronization signal block (SSB) and/or a Channel State Information-Reference Signal (CSI-RS) associated with a physical cell ID (PCI) of a second cell and for observing information related to a mobility group indicator (MGI);
- measuring the at least part of SSB and/or CSI-RS that is associated with the PCI; and
- observing the information related to the MGI, wherein a combination of the measured at least part of SSB and/or CSI-RS and the information related to the MGI enables to determine at least one of: whether the second cell is an intra-DU cell, an inter-DU cell or an in-ter-base station cell with respect to the first cell.

Embodiment 2

A method, e.g. performed by a user equipment (UE), the method comprising:

- receiving configuration information for measuring at least part of a synchronization signal block (SSB) and/or a Channel State Information-Reference Signal (CSI-RS) associated with a physical cell ID (PCI) of a second cell and for observing information related to a mobility group indicator (MGI), e.g. using the CSI-RS, in case the UE is connected to a first cell of a first network node (1201; DU1; gNB-DU) supporting one or more cells;
- measuring the at least part of SSB and/or CSI-RS that is associated with the PCI; and observing the information related to the MGI, wherein a combination of the measured at least part of SSB and/or CSI-RS and the information related to the MGI enables to determine at least one of: whether the second cell is cell supported by the first network node (1201; DU1; gNB-DU), a cell supported by a second network node (303: DU2) supporting one or more cells, wherein the first and the second network node are controlled by a common third network node (301; CU1; gNB-CU-CP), or a cell supported by a fifth network node (322; DU3; 323; DU4; 1202) supporting one or more cells, wherein the first and the fifth network node (322; DU3; 323; DU4; 1202) are controlled by different network nodes (301; CU1; gNB-CU-CP; 321; CU2).

Embodiment 3

The method of any of embodiments 1 or 2, wherein the configuration information comprises information for the UE for observing information related to a specific MGI associated with the PCI, the method further comprising:

- reporting, to the first DU or a first central unit (CU) of the first base station, information related to power of and/or an identity of the measured at least part of SSB and/or CSI-RS in case the UE observed the specific MGI associated with the PCI, and wherein in some examples the configuration information further comprises association information relating to an association between one or more mobility groups and one or more CSI-RS configurations.

Embodiment 4

The method of any of embodiments 1 or 2, wherein the configuration information comprises information for the UE for observing information related to a specific MGI associated with the PCI, the method further comprising:

- reporting, in case of a determined intra-DU cell or an inter-DU cell, to the first DU information related to power of and/or an identity of the measured at least part of SSB and/or CSI-RS, e.g. in case the UE observed the specific MGI associated with the PCI, and reporting, in case of a determined inter-base station cell, to a first central unit (CU) of the first base station information related to power of and/or an identity of the measured at least part of SSB and/or CSI-RS, e.g. in case the UE observed the specific MGI associated with the PCI.

Embodiment 5

The method of any of embodiments 1 or 2, wherein the configuration information comprises information for the UE for observing information related to a specific MGI associated with the PCI, the method further comprising:

- reporting, in case of a determined intra-DU cell or an inter-DU cell to the first DU, L1 measurements, and
- reporting, in case of a determined inter-base station cell to a first central unit (CU) of the first base station, L3 measurements.

Embodiment 6

The method of any of embodiments 1 or 2, wherein the configuration information comprises information for the UE for observing information related to a specific MGI associated with the PCI; the method further comprising:

- reporting, to the first DU, information related to power of the measured at least part of SSB and/or CSI-RS and information related to power measured in the course of observing the information related to the MGI associated with the specific PCI to enable the first DU to determine whether the second cell is an intra-DU cell, an inter-DU cell or an inter-base station cell with respect to the first cell.

Embodiment 7

The method of any of embodiments 1 or 2, the method further comprising:

- a plurality of iterations of measuring a respective at least part of SSB and/or CSI-RS that is associated with a respective PCI and of observing respective information related to a respective MGI;
- selecting, according to predefined rules, an observed power indicator value from a plurality of observed power indicator values associated with respective observed information related to a respective MGI; and
- reporting, to the first DU, information related to the selected observed power indicator value and information identifying the at least part of SSB and/or CSI-RS measured in the same iteration of the plurality of iterations as the selected observed power indicator value.

Embodiment 8

The method of any of embodiments 1 to 7, the method further comprising:

- reporting, to the first DU, information identifying a MGI observed by the UE.

Embodiment 9

The method of any of embodiments 1 to 8, the method further comprising:

- receiving a cell change command comprising information indicating a PCI and information indicating a specific MGI associated with the PCI; and
- identifying, based at least on the information indicating the PCI and on the information indicating the specific MGI associated with the PCI comprised in the cell change command, a target cell for a cell change.

Embodiment 10

The method of any of embodiments 1 to 9, wherein the MGI is a channel state information

- reference signal (CSI-RS) configuration, e.g. a CSI-RS resource configuration.

Embodiment 11

A method, e.g. performed by a unit, e.g. a first distributed unit or a first central unit, of a first base station, the method comprising:

- transmitting, to a user equipment (UE) connected to a first cell of the first distributed unit (DU) of the first base station, configuration information for measuring at least part of a synchronization signal block (SSB) and/or a channel state information-reference signal (CSI-RS) associated with a physical cell ID (PCI) of a second cell and for observing information related to a mobility group indicator (MGI), e.g. using the CSI-RS, wherein a combination of the at least part of SSB and/or CSI-RS having been measured and the information related to the MGI enables to determine at least one of: whether the second cell is an intra-DU cell, an inter-DU cell or an inter-base station cell with respect to the first cell.

Embodiment 12

A method, e.g. performed by a unit, e.g. a first central unit (CU), of a first base station, the method comprising:

- transmitting, to a distributed unit of the first base station hosting a first cell, configuration information for a UE connected to the first cell, for example indicating an association between one or more mobility groups and one or more respective CSI-RS resources, for measuring at least part of a synchronization signal block (SSB) and/or a Channel State In-formation-Reference Signal (CSI-RS) associated with a physical cell ID (PCI) of a second cell and for observing information related to a mobility group indicator (MGI), e.g. using the CSI-RS, wherein a combination of the at least part of SSB and/or CSI-RS having been measured and the information related to the MGI enables to determine at least one of: whether the second cell is an intra-DU cell, an inter-DU cell or an inter-base station cell with respect to the first cell.

Embodiment 13

The method of any of embodiments 1 to 12, wherein the first DU is one of a plurality of DUs, wherein a same MGI is used in all cells of the first DU, and wherein the MGI used in all cells of the first DU is different from all MGIs used in cells of one or more other DUs of the plurality of DUs that are adjacent to the first cell.

Embodiment 14

The method of any of embodiments 1 to 13, wherein the first DU is one of a plurality of DUs, wherein a common MGI is used for at least those cells of the first DU which are adjacent to the first cell, and wherein the common MGI is different from MGIs used in at least those cells of one or more other DUs of the plurality of DUs that are adjacent to the first cell.

Embodiment 15

The method of any of embodiments 1 to 14, wherein a common MGI is used for cells of the first DU.

Embodiment 16

The method of embodiment 15, wherein another common MGI is used for cells of a second DU, wherein the common MGI used for cells of the first DU and the another common MGI used for cells of the second DU are different.

Embodiment 17

The method of embodiment 16, wherein the first and the second DU are both controlled by a common CU.

Embodiment 18

The method of any of embodiments 1 to 17, wherein the first DU is one of a plurality of DUs, wherein the PCI is unique across the cells of the first DU, and wherein the same PCI is assignable and/or assigned to one or more other cells of one or more other DUs of the plurality of DUs.

Embodiment 19

The method of any of embodiments 1 to 18, wherein the configuration information is sent from a central unit-control plane (CU-CP) of the first base station to the UE, and/or wherein the configuration information relates to layer 3 (L3) measurements.

Embodiment 20

The method of any of embodiments 1 to 19, wherein the configuration information is sent from a DU of the first base station, in particular the first DU, to the UE, and/or wherein the configuration information relates to layer 1/layer 2 (L1/L2) measurements.

Embodiment 21

The method of any of embodiments 1 to 20, wherein the MGI is a channel state information-reference signal (CSI-RS) configuration, e.g. a CSI-RS resource configuration.

Embodiment 22

A method, e.g. performed by a network node, the method comprising:

- configuring or contributing to configuring a first DU of a first base station to use a common MGI in one or more or all of its cells, wherein the first DU is one of a plurality of DUs; and
- configuring or contributing to configuring one or more other DUs of the plurality of DUs to use an MGI different from the common MGI used in the one or more or all of cells of the first DU for one or more or all of their or its cells.

Embodiment 23

A method, e.g. performed by a third network node (1203; CU1; gNB-CU-CP) comprising at least one processor; and at least one memory including computer program code; the at least one memory and the computer program code configured to, with the at least one processor, cause the third network node (1203; CU1; gNB-CU-CP) at least to perform the method, the method comprising:

- configuring or contributing to configuring a first network node (1201; DU1; gNB-DU)) to use a common mobility group indicator (MGI) in one or more or all of its supported cells, wherein the first network node (1201; DU1; gNB-DU) is one of a plurality of network nodes (DU2; DU3; DU4) supporting cells; and
- configuring or contributing to configuring one or more other network nodes (DU2; DU3; DU4) of the plurality of network nodes supporting cells to use an MGI different from the common MGI used in the one or more or all of cells of the first network node (1201; DU1) for one or more or all of their or its supported cells.

Embodiment 24

The method according to embodiment 23, wherein the first network node (1201; DU1; gNB-DU) supports a Distribution Unit functionality and/or L2 processing, the third network node (1203; CU1; gNB-CU-CP) provides a Central Unit functionality and/or L3 processing.

Embodiment 25

The method according to any of embodiments 23-24, wherein, the first network node (1201; DU1; gNB-DU) provides a serving cell.

Embodiment 26

A method, e.g. performed by a third network node (1203; CU1; gNB-CU-CP) comprising at least one processor; and at least one memory including computer program code; the at least one memory and the computer program code configured to, with the at least one processor, cause the third network node (1203; CU1; gNB-CU-CP) at least to perform the method, the method comprising:

- coordinating use of different mobility group indicators (MGI) in at least two cells of different network nodes supporting cells, by receiving an assigned common MGI of a first network node (1201; DU1; gNB-DU) and receiving an assigned common MGI of a second network node (1202: DU2), checking whether the two MGIs are the same or different, in case they are the same, transmitting towards one of the first or the second network node an instruction to change its MGI.

Embodiment 27

A method, e.g. performed by a third network node (1203; CU1; gNB-CU-CP) comprising at least one processor; and at least one memory including computer program code; the at least one memory and the computer program code configured to, with the at least one processor, cause the third network node (1203; CU1; gNB-CU-CP) at least to perform the method, the method comprising:

- coordinating use of different mobility group indicators (MGI) in at least two cells of different network nodes supporting cells, by configuring a first network node (1201; DU1; gNB-DU) to use a first common MGI in at least one cell supported by the first network node and configuring a second network node (1202: DU2; gNB- DU) to use a second common MGI in at least one cell supported by the second network node (1202: DU2), wherein the first MGI is different from the second MGI.

Embodiment 28

The method of any of embodiments 22-27, the method further comprising:

informing the first network node (1201; DU1; gNB-DU) that the second common MGI is used in at least one cell supported by the second network node (1202: DU2).

Embodiment 29

The method of any of embodiments 22-28, wherein the MGI is a channel state information reference signal (CSI-RS) configuration, e.g. a CSI-RS resource configuration.

Embodiment 30

An apparatus comprising at least one processor; and at least one memory including computer program code; the at least one memory and the computer program code configured to, with the at least one processor, cause the apparatus at least to perform the method of any of embodiments 1 to 29.

Embodiment 31

An apparatus comprising means configured to perform the method of any of embodiments 1 to 29.

Embodiment 32

The apparatus of any of embodiments 30 to 31, wherein the apparatus is a or the UE.

Embodiment 33

The apparatus of any of embodiments 30 to 31, wherein the apparatus is a or the unit, e.g. a or the first distributed unit and/or a or the first central unit, e.g. of the first base station, or provides functionality of a or the unit, e.g. a or the first distributed unit and/or a or the first central unit.

Embodiment 34

The apparatus of any of embodiments 30 to 31, wherein the apparatus is a base station.

Embodiment 35

The apparatus of any of embodiments 30 to 31, wherein the apparatus is a network node.

Embodiment 36

A system comprising at least two of the following apparatuses:

the apparatus of any of embodiments 30 to 31, performing the method of any of embodiments 1 to 10;

one or more apparatuses of any of embodiments 30 to 31, performing the method of any of embodiments 11 to 21;

the apparatus of any of embodiments 30 to 31, performing the method of any of embodiments 22 to 28.

Embodiment 37

A computer-readable medium storing computer program code, the computer program code when executed by a processor causing an apparatus, e.g. the apparatus of any of embodiments 30 to 31, to perform and/or control the method of any of embodiments 1 to 28.

Embodiment 38

A computer program, the computer program when executed by a processor causing an apparatus, e.g. the apparatus of any of embodiments 307 to 31, to perform and/or control the method of any of embodiments 1 to 28.

The units referred to above may be respective apparatuses or respective functionality provided by a respective network node. Thus, a unit performing a method is understood to explicitly disclose a network node comprising at least one processor; and at least one memory including computer program code; the at least one memory and the computer program code configured to, with the at least one processor, cause the network node at least to perform the functionality of the unit performing the method. Similarly, a unit performing a method is understood to explicitly disclose a network node comprising means for performing the functionality of the unit performing the method. Further, the expressions "of/to/from a unit" also explicitly disclose "of/to/from a network node providing the functionality of the unit", respectively.

The means referred to above can be implemented in hardware. It may comprise for instance at least one processor for executing computer program code for performing the required function, at least one memory storing the program code and/or data, or both. Additionally or alternatively, it may for instance comprise circuitry that is designed to implement functions, for instance implemented in a chipset or a chip, like an integrated circuit. The means may comprise for instance one or more processing means or processors.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM) or hard disk of a computer, or be intended for distribution of the program, like an optical disc.

The invention claimed is:

1. A user equipment (UE) that filters layer 1 reference signal received power (L1-RSRP) measurements for L1 and layer 2 (L2) mobility based on detection of mobility group indicator (MGI), the UE comprising:

at least one processor; and at least one memory including computer program code;

the at least one memory and the computer program code configured to, with the at least one processor, cause the UE at least to perform the following:

receiving configuration information for measuring at least part of a synchronization signal block (SSB) and a Channel State Information-Reference Signal (CSI-RS) associated with a physical cell ID (PCI) of a second cell and for observing information related to a mobility group indicator (MGI) wherein the configuration information comprises information for the UE for observing information related to a specific MGI associated with the PCI, association information between mobility groups and resources of the CSI-RS;

using the CSI-RS based on the UE being connected to a first cell of a first distributed unit (DU) of a first base station;

executing a plurality of iterations of measuring a respective at least part of SSB and CSI-RS that is associated with a respective PCI and of observing respective information related to a respective MGI;

based on a combination of the measured at least part of SSB and CSI-RS and the information related to the MGI, determining the second cell is one of the following: an intra-DU cell, an inter-DU cell, or an inter-base station cell with respect to the first cell;

selecting, according to predefined rules, an observed power indicator value from a plurality of observed power indicator values associated with respective observed information related to a respective MGI;

reporting, to the first DU, information related to power and identity of the measured at least part of SSB and CSI-RS in case the UE observed the specific MGI associated with the PCI, and information related to power measured based on observing the information related to the MGI associated with a specific PCI to enable the first DU to determine whether the second cell is an intra-DU cell, an inter-DU cell or an inter-base station cell with respect to the first cell;

reporting, in case of a determined inter-base station cell, to a first central unit (CU) of the first base station, information related to power and identity of the measured at least part of SSB and CSI-RS in case the UE observed the specific MGI associated with the PCI and layer 3 measurements;

reporting, to the first DU, information related to the selected observed power indicator value and information identifying the at least part of SSB and CSI-RS measured in the same iteration of the plurality of iterations as the selected observed power indicator value;

receiving a cell change command comprising information indicating a PCI and information indicating a specific MGI associated with the PCI; and identifying, based at least on the information indicating the PCI and indicating the specific MGI associated with the PCI comprised in the cell change command, a target cell for a cell change.

2. The UE of claim 1, wherein the first DU is one of a plurality of DUs, wherein a same MGI is used in all cells of the first DU, and wherein the MGI used in all cells of the first DU is different from all MGIs used in cells of one or more other DUs of the plurality of DUs that are adjacent to the first cell.

3. The UE of claim 1, wherein the first DU is one of a plurality of DUs, wherein a common MGI is used for at least those cells of the first DU which are adjacent to the first cell, and wherein the common MGI is different from MGIs used in at least those cells of one or more other DUs of the plurality of DUs that are adjacent to the first cell.

4. The UE of claim 2, wherein a common MGI is used for cells of the first DU.

5. The UE of claim 4, wherein another common MGI is used for cells of a second DU, wherein the common MGI used for cells of the first DU and the another common MGI used for cells of the second DU are different.

6. The UE of claim 5, wherein the first and the second DU are both controlled by a common CU.

7. The UE of claim 1, wherein the first DU is one of a plurality of DUs, wherein the PCI is unique across cells of the first DU, and wherein the same PCI is assignable and assigned to one or more other cells of one or more other DUs of the plurality of DUs.

8. The UE of claim 1, wherein the configuration information is sent from a central unit-control plane (CU-CP) of the first base station to the UE, and wherein the configuration information relates to layer 3 measurements.

9. The UE of claim 1, wherein the configuration information is sent from a DU of the first base station, in particular the first DU, to the UE, and wherein the configuration information relates to layer 1/layer 2 (L1/L2) measurements.

10. A system comprising:

a user equipment (UE) that filters layer 1 reference signal received power (L1-RSRP) measurements for L1 and layer 2 (L2) mobility based on detection of mobility group indicator (MGI):

a processor; and a non-transitory computer-readable medium comprising computer-executable instructions that, when executed by the processor, cause the processor to perform the following operations:

receiving configuration information for measuring at least part of a synchronization signal block (SSB) and a Channel State Information-Reference Signal (CSI-RS) associated with a physical cell ID (PCI) of a second cell and for observing information related to a mobility group indicator (MGI) wherein the configuration information comprises information for the UE for observing information related to a specific MGI associated with the PCI, association information between mobility groups and resources of the CSI-RS;

using the CSI-RS based on the UE being connected to a first cell of a first distributed unit (DU) of a first base station;

executing a plurality of iterations of measuring a respective at least part of SSB and CSI-RS that is associated with a respective PCI and of observing respective information related to a respective MGI;

based on a combination of the measured at least part of SSB and CSI-RS and the information related to the MGI, determining the second cell is one of the following: an intra-DU cell, an inter-DU cell, or an inter-base station cell with respect to the first cell;

selecting, according to predefined rules, an observed power indicator value from a plurality of observed power indicator values associated with respective observed information related to a respective MGI;

reporting, to the first DU, information related to power and identity of the measured at least part of SSB and CSI-RS in case the UE observed the specific MGI associated with the PCI, and information related to power measured based on observing the information related to the MGI associated with a specific PCI to enable the first DU to determine whether the second cell is an intra-DU cell, an inter-DU cell or an inter-base station cell with respect to the first cell;

reporting, in case of a determined inter-base station cell, to a first central unit (CU) of the first base station, information related to power and identity of the measured at least part of SSB and CSI-RS in case the UE observed the specific MGI associated with the PCI and layer 3 measurements;

reporting, to the first DU, information related to the selected observed power indicator value and information identifying the at least part of SSB and CSI-RS measured in the same iteration of the plurality of iterations as the selected observed power indicator value;

receiving a cell change command comprising information indicating a PCI and information indicating a specific MGI associated with the PCI; and identifying, based on the information indicating the PCI and indicating the specific MGI associated with the PCI comprised in the cell change command, a target cell for a cell change.

11. The system of claim 10, wherein the first DU is one of a plurality of DUs, wherein a same MGI is used in all cells of the first DU, and wherein the MGI used in all cells of the first DU is different from all MGIs used in cells of one or more other DUs of the plurality of DUs that are adjacent to the first cell.

12. The system of claim 10, wherein the first DU is one of a plurality of DUs, wherein a common MGI is used for at least those cells of the first DU which are adjacent to the first cell, and wherein the common MGI is different from MGIs used in at least those cells of one or more other DUs of the plurality of DUs that are adjacent to the first cell.

13. The system of claim 10, wherein a common MGI is used for cells of the first DU.

14. The system of claim 13, wherein another common MGI is used for cells of a second DU, wherein the common MGI used for cells of the first DU and the another common MGI used for cells of the second DU are different.

15. The system of claim 14, wherein the first and the second DU are both controlled by a common CU.

16. The system of claim 10, wherein the first DU is one of a plurality of DUs, wherein the PCI is unique across cells of the first DU, and wherein the same PCI is assignable and assigned to one or more other cells of one or more other DUs of the plurality of DUs.

17. The system of claim 10, wherein the configuration information is sent from a central unit-control plane (CU-CP) of the first base station to the UE, and wherein the configuration information relates to layer 3 measurements.

18. The system of claim 10, wherein the configuration information is sent from a DU of the first base station, in particular the first DU, to the UE, and wherein the configuration information relates to layer 1/layer 2 (L1/L2) measurements.

19. A method comprising:

receiving configuration information for measuring at least part of a synchronization signal block (SSB) and a Channel State Information-Reference Signal (CSI-RS) associated with a physical cell ID (PCI) of a second cell and for observing information related to a mobility group indicator (MGI) wherein the configuration information comprises information for the UE for observing information related to a specific MGI associated with the PCI, association information between mobility groups and resources of the CSI-RS;

using the CSI-RS based on the UE being connected to a first cell of a first distributed unit (DU) of a first base station;

executing a plurality of iterations of measuring a respective at least part of SSB and CSI-RS that is associated with a respective PCI and of observing respective information related to a respective MGI;

based on a combination of the measured at least part of SSB and CSI-RS and the information related to the MGI, determining the second cell is one of the following: an intra-DU cell, an inter-DU cell, or an inter-base station cell with respect to the first cell;

selecting, according to predefined rules, an observed power indicator value from a plurality of observed power indicator values associated with respective observed information related to a respective MGI;

reporting, to the first DU, information related to power and identity of the measured at least part of SSB and CSI-RS in case the UE observed the specific MGI associated with the PCI, and information related to power measured based on observing the information related to the MGI associated with a specific PCI to enable the first DU to determine whether the second cell is an intra-DU cell, an inter-DU cell or an inter-base station cell with respect to the first cell;

reporting, in case of a determined inter-base station cell, to a first central unit (CU) of the first base station, information related to power and identity of the measured at least part of SSB and CSI-RS in case the UE observed the specific MGI associated with the PCI and layer 3 measurements;

reporting, to the first DU, information related to the selected observed power indicator value and information identifying the at least part of SSB and CSI-RS measured in the same iteration of the plurality of iterations as the selected observed power indicator value;

receiving a cell change command comprising information indicating a PCI and information indicating a specific MGI associated with the PCI; and identifying, based on the information indicating the PCI and indicating the specific MGI associated with the PCI comprised in the cell change command, a target cell for a cell change.

20. The method of claim 19, wherein the first DU is one of a plurality of DUs, wherein a same MGI is used in all cells of the first DU, and wherein the MGI used in all cells of the first DU is different from all MGIs used in cells of one or more other DUs of the plurality of DUs that are adjacent to the first cell.

* * * * *